US012256441B2

United States Patent
Sakhnini et al.

(10) Patent No.: US 12,256,441 B2
(45) Date of Patent: Mar. 18, 2025

(54) RANDOM ACCESS CHANNEL PROCESS USING SINGLE CARRIER WAVEFORMS

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 17/201,598

(22) Filed: Mar. 15, 2021

(65) Prior Publication Data

US 2022/0295569 A1    Sep. 15, 2022

(51) Int. Cl.
| | |
|---|---|
| *H04W 74/0833* | (2024.01) |
| *H04L 5/00* | (2006.01) |
| *H04L 27/26* | (2006.01) |
| *H04W 74/00* | (2009.01) |
| *H04W 74/0836* | (2024.01) |

(52) U.S. Cl.
CPC ....... *H04W 74/0841* (2013.01); *H04L 5/0051* (2013.01); *H04L 27/26025* (2021.01); *H04L 27/2607* (2013.01); *H04L 27/2636* (2013.01); *H04W 74/002* (2013.01)

(58) Field of Classification Search
CPC ............ H04W 74/0841; H04W 74/008; H04L 5/0051; H04L 27/26025; H04L 27/2607; H04L 27/2636
See application file for complete search history.

(56) References Cited

U.S. PATENT DOCUMENTS

| | | | | |
|---|---|---|---|---|
| 2018/0167137 A1* | 6/2018 | Azizi | .................. | H04B 7/2656 |
| 2019/0069297 A1* | 2/2019 | Lee | .................. | H04W 74/0833 |
| 2020/0267774 A1* | 8/2020 | Vos | .................. | H04W 74/0833 |
| 2020/0313835 A1* | 10/2020 | Ji | .......................... | H04L 5/0053 |
| 2020/0396744 A1* | 12/2020 | Xiong | .................. | H04B 7/088 |
| 2021/0329703 A1* | 10/2021 | Yang | .................. | H04L 5/001 |
| 2021/0400595 A1* | 12/2021 | Sutskover | .......... | H04W 52/226 |
| 2022/0053571 A1* | 2/2022 | Lee | .................. | H04W 74/0841 |
| 2022/0085940 A1* | 3/2022 | Xiong | .................. | H04L 5/0053 |

(Continued)

*Primary Examiner* — Harry H Kim
(74) *Attorney, Agent, or Firm* — Loza & Loza, LLP

(57) ABSTRACT

For a two-step random access channel (RACH) process, the base station determines a random access configuration to configure a user equipment (UE) with the two-step RACH process that includes a communication of a first message including a preamble portion and a payload portion, where the determining the random access configuration includes determining to exclude a demodulation reference signal (DMRS) from the payload portion based on satisfaction of conditions. The base station generates configuration information including the random access configuration indicating the two-step RACH process, the configuration information including a configuration for a transmission of the preamble portion and the payload portion without the DMRS based on the satisfaction of the conditions. The base station transmits the configuration information to the UE, and subsequently receives, based on the configuration information, a first RACH message that includes the preamble portion and the payload portion without the DMRS, using the single carrier waveform.

30 Claims, 20 Drawing Sheets

(56) References Cited

U.S. PATENT DOCUMENTS

2022/0104278 A1*  3/2022  Lin .................... H04W 74/0841
2022/0132591 A1*  4/2022  Agiwal ............. H04W 74/0866
2022/0132595 A1*  4/2022  Ko ...................... H04W 74/008

* cited by examiner

2000

```
Start
  │
  ▼
┌─────────────────────────────────────────────┐
│ Receive, from a base station, configuration │
│ information including a random access       │ ~2002
│ configuration indicating a two-step random  │
│ access channel (RACH) process, the two-step │
│ RACH process comprising a communication of  │
│ a first message that includes a preamble    │
│ portion including a physical random access  │
│ channel (PRACH) message and further         │
│ includes a payload portion including a      │
│ physical uplink shared channel (PUSCH)      │
│ message, wherein the configuration          │
│ information includes a configuration for a  │
│ transmission of the preamble portion and a  │
│ transmission of the payload portion without │
│ the DMRS based on satisfaction of one or    │
│ more conditions                             │
└─────────────────────────────────────────────┘
  │
  ▼
┌─────────────────────────────────────────────┐
│ Configure the UE with the two-step RACH     │ ~2004
│ process based on the configuration          │
│ information                                 │
└─────────────────────────────────────────────┘
  │
  ▼
┌─────────────────────────────────────────────┐
│ Transmit, to the base station and based on  │
│ the configuration information, a first RACH │ ~2006
│ message that includes the preamble portion  │
│ and the payload portion without the DMRS,   │
│ using the single carrier waveform           │
└─────────────────────────────────────────────┘
  │
  ▼
┌ ─ ─ ─ ─ ─ ─ ─ ─ ─ ─ ─ ─ ─ ─ ─ ─ ─ ─ ─ ─ ─ ─┐
│ Receive, from the base station, a second    │ ~2008
│ RACH message including the random access    │
│ response and the contention resolution      │
│ message                                     │
└ ─ ─ ─ ─ ─ ─ ─ ─ ─ ─ ─ ─ ─ ─ ─ ─ ─ ─ ─ ─ ─ ─┘
  │
  ▼
 End
```

FIG. 20

RANDOM ACCESS CHANNEL PROCESS USING SINGLE CARRIER WAVEFORMS

TECHNICAL FIELD

The technology discussed below relates generally to wireless communication systems, and more particularly, to a two-step random access channel process for single carrier waveforms.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems and fifth generation (5G) systems which may be referred to as New Radio (NR) systems. In wireless communication systems, an access point (e.g., a base station) may communicate with a user equipment (UE) (e.g., a smartphone). Some wireless communications systems may support a random access process such as a random access channel (RACH) process for communication between a UE and a base station, in order to set up a connection between the UE and the base station. The random access process may involve several messages exchanged between the UE and the base station. Different types of random access processes may be available, and various improvements may be made for the random access processes.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure are related to improving a 2-step random access channel (RACH) process that includes a first step of communicating a first message (e.g., MsgA) including a preload portion with a physical random access channel (PRACH) message and a payload portion with a physical uplink shared channel (PUSCH) message, and a second step of communicating a second message (e.g., MsgB) including a random access response and a contention resolution message. According to some aspects, approaches described below enable exclusion of a demodulation reference signal (DMRS) from the payload portion of the first message of the two-step RACH process utilizing a single carrier waveform, such that overhead may be reduced.

In one example, a method of wireless communication utilizing a single carrier waveform by a base station is disclosed. The method includes determining a random access configuration to configure at least one user equipment (UE) with a two-step random access channel (RACH) process that comprises a communication of a first message that includes a preamble portion including a physical random access channel (PRACH) message and further includes a payload portion including a physical uplink shared channel (PUSCH) message, wherein the determining the random access configuration comprises determining to exclude a demodulation reference signal (DMRS) from the payload portion based on satisfaction of one or more conditions, and generating configuration information including the random access configuration indicating the two-step RACH process, the configuration information including a configuration for a transmission of the preamble portion and a transmission of the payload portion without the DMRS based on the satisfaction of one or more conditions, transmitting the configuration information to the at least one UE, and receiving, from the at least one UE and based on the configuration information, a first RACH message that includes the preamble portion and the payload portion without the DMRS, using the single carrier waveform.

In another example, a base station for wireless communication utilizing a single carrier waveform is disclosed. The base station includes at least one processor, a transceiver communicatively coupled to the at least one processor, and a memory communicatively coupled to the at least one processor. The at least one processor may be configured to: determine a random access configuration to configure at least one UE with a two-step RACH process that comprises a communication of a first message that includes a preamble portion including a PRACH message and further includes a payload portion including a PUSCH message, wherein the determining the random access configuration comprises determining to exclude a DMRS from the payload portion based on satisfaction of one or more conditions, generate configuration information including the random access configuration indicating the two-step RACH process, the configuration information including a configuration for a transmission of the preamble portion and a transmission of the payload portion without the DMRS based on the satisfaction of one or more conditions, transmit the configuration information to the at least one UE, and receive, from the at least one UE and based on the configuration information, a first RACH message that includes the preamble portion and the payload portion without the DMRS, using the single carrier waveform.

In another example, a non-transitory processor-readable storage medium having instructions for a base station for wireless communication utilizing a single carrier waveform thereon may be disclosed. The instructions, when executed by a processing circuit, cause the processing circuit to: determine a random access configuration to configure at least one UE with a two-step RACH process that comprises a communication of a first message that includes a preamble portion including a PRACH message and further includes a payload portion including a PUSCH message, wherein the determining the random access configuration comprises determining to exclude a DMRS from the payload portion based on satisfaction of one or more conditions, generate configuration information including the random access configuration indicating the two-step RACH process, the configuration information including a configuration for a transmission of the preamble portion and a transmission of the payload portion without the DMRS based on the satisfaction of one or more conditions, transmit the configuration information to the at least one UE, and receive, from the at least one UE and based on the configuration information, a first RACH message that includes the preamble portion and the payload portion without the DMRS, using the single carrier waveform.

In a further example, a base station for wireless communication utilizing a single carrier waveform may be disclosed. The base station includes means for determining a random access configuration to configure at least one UE with a two-step RACH process that comprises a communication of a first message that includes a preamble portion including a PRACH message and further includes a payload portion including a PUSCH message, wherein the determining the random access configuration comprises determining to exclude a DMRS from the payload portion based on satisfaction of one or more conditions, means for generating configuration information including the random access configuration indicating the two-step RACH process, the configuration information including a configuration for a transmission of the preamble portion and a transmission of the payload portion without the DMRS based on the satisfaction of one or more conditions, means for transmitting the configuration information to the at least one UE, and means for receiving, from the at least one UE and based on the configuration information, a first RACH message that includes the preamble portion and the payload portion without the DMRS, using the single carrier waveform.

In one example, a method of wireless communication by a user equipment (UE) utilizing a single carrier waveform is disclosed. The method includes receiving, from a base station, configuration information including a random access configuration indicating a two-step random access channel (RACH) process, the two-step RACH process comprising a communication of a first message that includes a preamble portion including a physical random access channel (PRACH) message and further includes a payload portion including a physical uplink shared channel (PUSCH) message, wherein the configuration information includes a configuration for a transmission of the preamble portion and a transmission of the payload portion without the DMRS based on satisfaction of one or more conditions, configuring the UE with the two-step RACH process based on the configuration information, and transmitting, to the base station and based on the configuration information, a first RACH message that includes the preamble portion and the payload portion without the DMRS, using the single carrier waveform.

In another example, a UE for wireless communication utilizing a single carrier waveform is disclosed. The UE includes at least one processor, a transceiver communicatively coupled to the at least one processor, and a memory communicatively coupled to the at least one processor. The at least one processor may be configured to receive, from a base station, configuration information including a random access configuration indicating a two-step RACH process, the two-step RACH process comprising a communication of a first message that includes a preamble portion including a PRACH message and further includes a payload portion including a PUSCH message, wherein the configuration information includes a configuration for a transmission of the preamble portion and a transmission of the payload portion without the DMRS based on satisfaction of one or more conditions, configure the UE with the two-step RACH process based on the configuration information, and transmit, to the base station and based on the configuration information, a first RACH message that includes the preamble portion and the payload portion without the DMRS, using the single carrier waveform.

In another example, a non-transitory processor-readable storage medium having instructions for UE for wireless communication utilizing a single carrier waveform thereon may be disclosed. The instructions, when executed by a processing circuit, cause the processing circuit to receive, from a base station, configuration information including a random access configuration indicating a two-step RACH process, the two-step RACH process comprising a communication of a first message that includes a preamble portion including a PRACH message and further includes a payload portion including a PUSCH message, wherein the configuration information includes a configuration for a transmission of the preamble portion and a transmission of the payload portion without the DMRS based on satisfaction of one or more conditions, configure the UE with the two-step RACH process based on the configuration information, and transmit, to the base station and based on the configuration information, a first RACH message that includes the preamble portion and the payload portion without the DMRS, using the single carrier waveform.

In a further example, a UE for wireless communication utilizing a single carrier waveform may be disclosed. The UE includes means for receiving, from a base station, configuration information including a random access configuration indicating a two-step RACH process, the two-step RACH process comprising a communication of a first message that includes a preamble portion including a PRACH message and further includes a payload portion including a PUSCH message, wherein the configuration information includes a configuration for a transmission of the preamble portion and a transmission of the payload portion without the DMRS based on satisfaction of one or more conditions, means for configuring the UE with the two-step RACH process based on the configuration information, and means for transmitting, to the base station and based on the configuration information, a first RACH message that includes the preamble portion and the payload portion without the DMRS, using the single carrier waveform.

These and other aspects of the disclosure will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 20 is a flow chart illustrating an exemplary process for wireless communication utilizing a single carrier waveform, according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
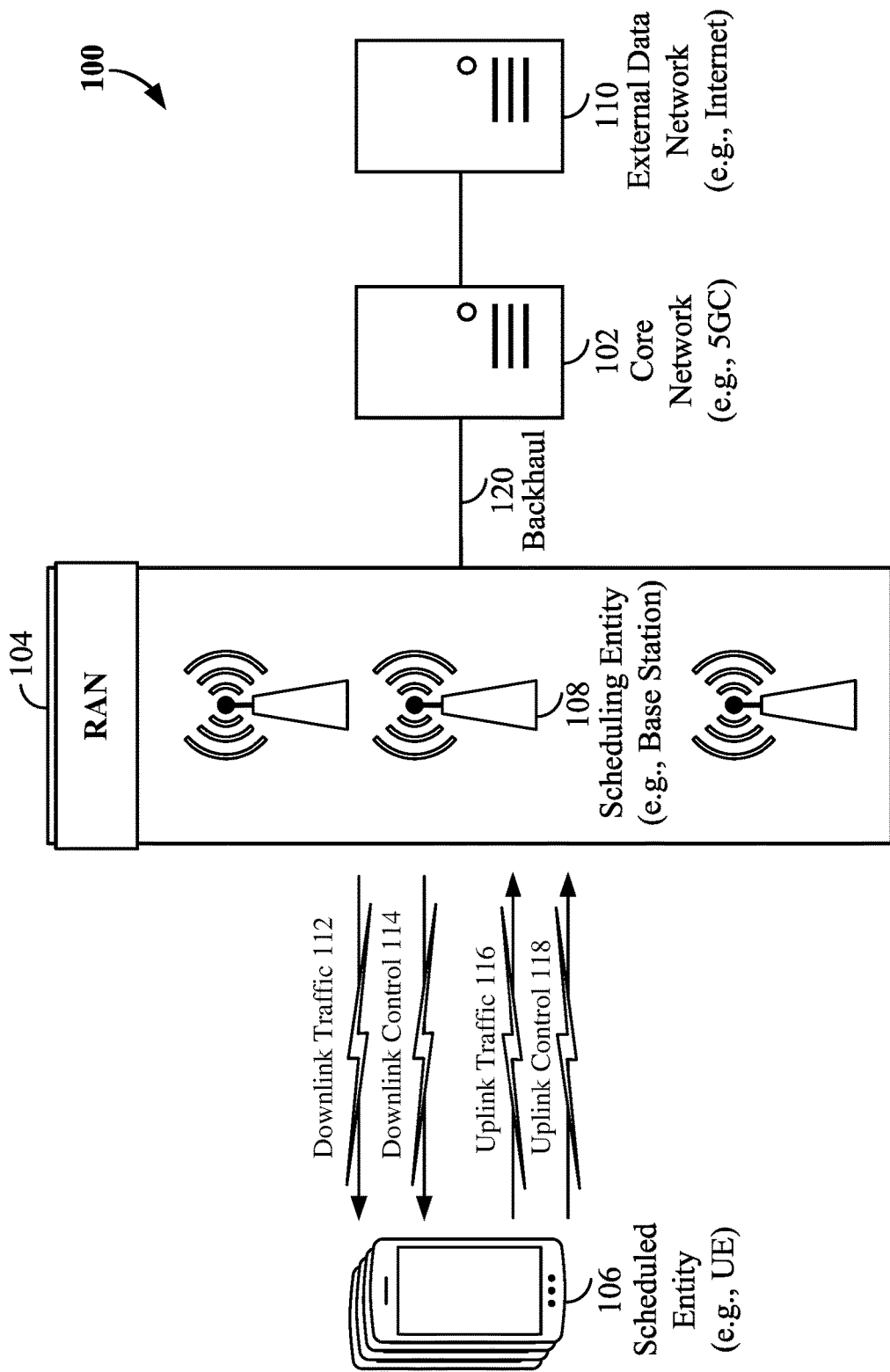
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP) or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; vehicles, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
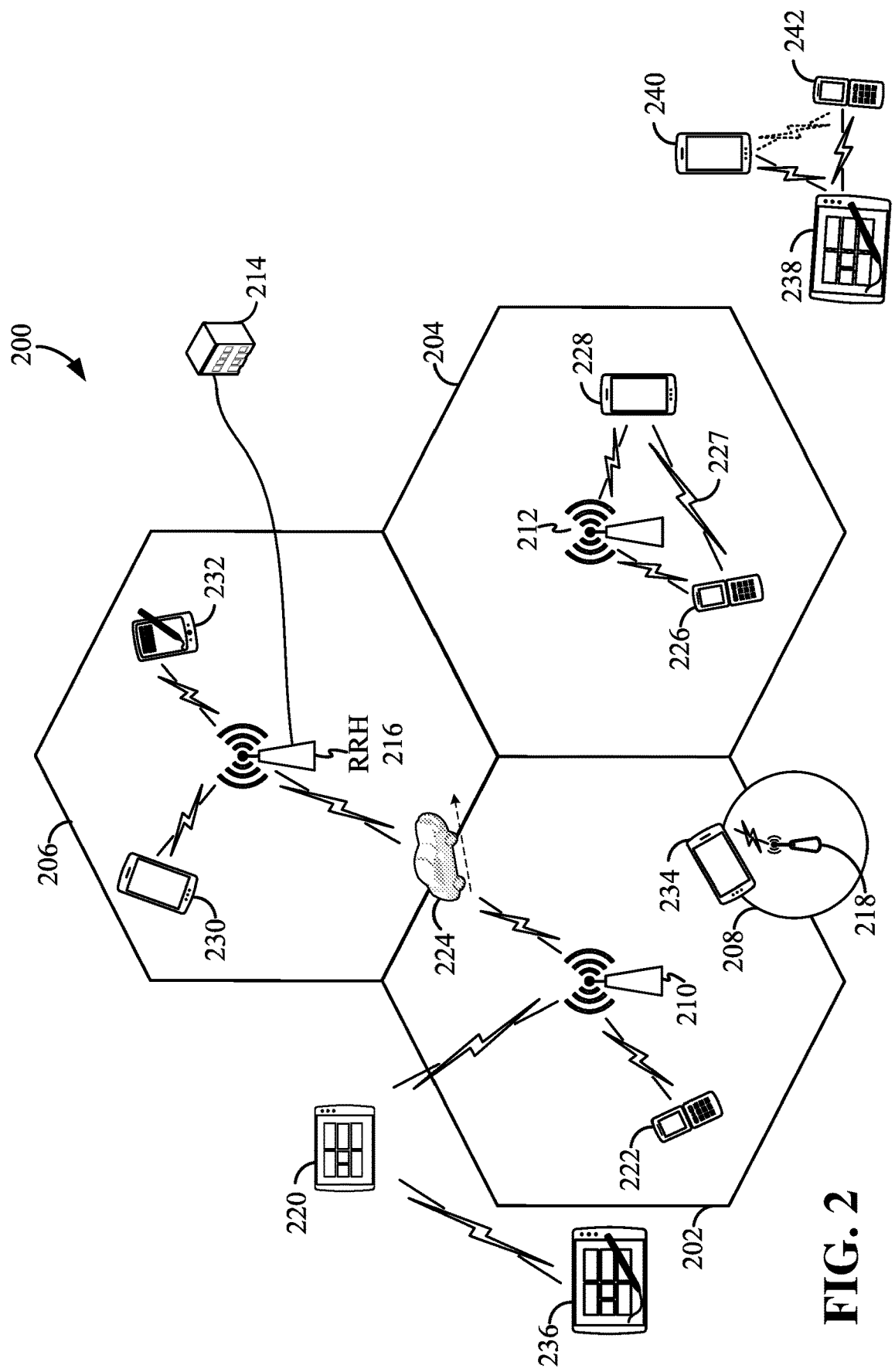
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown).

A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a mobile device 220, which may be configured to function as a base station. That is, in some examples, a cell may not necessarily be stationary, and the geographic area of the cell may move according to the location of a mobile base station such as the mobile device 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., mobile device 220) may be configured to function as a UE. For example, the mobile device 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 200 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 3:
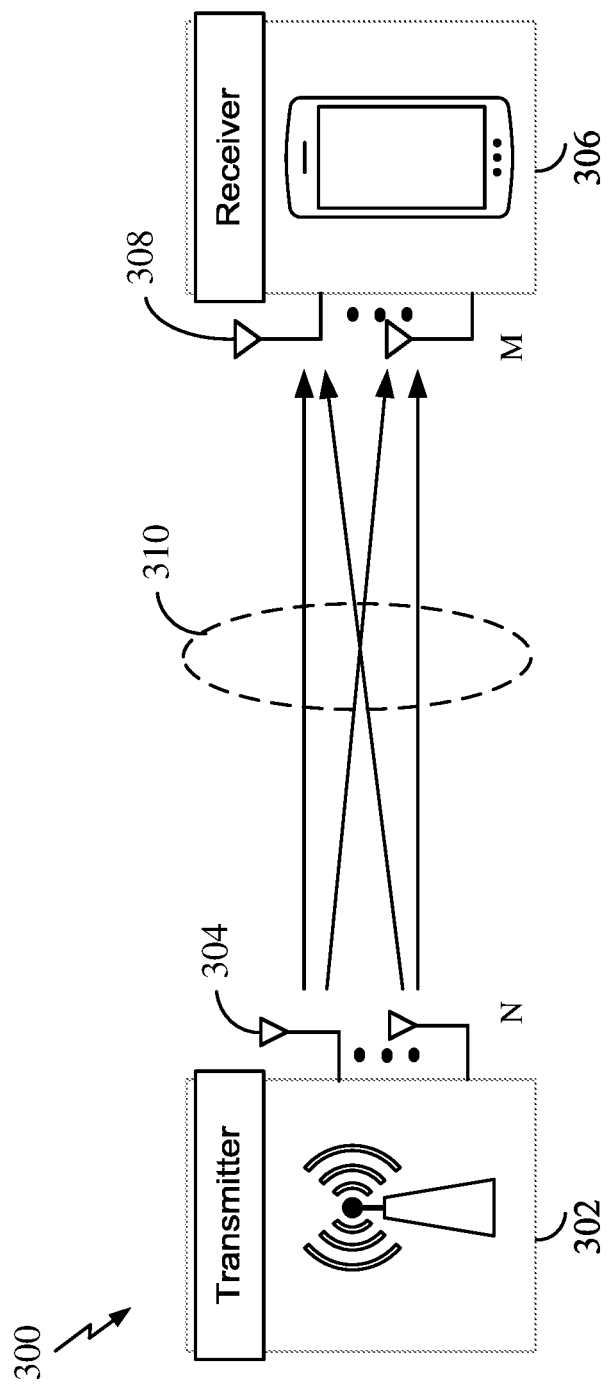
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
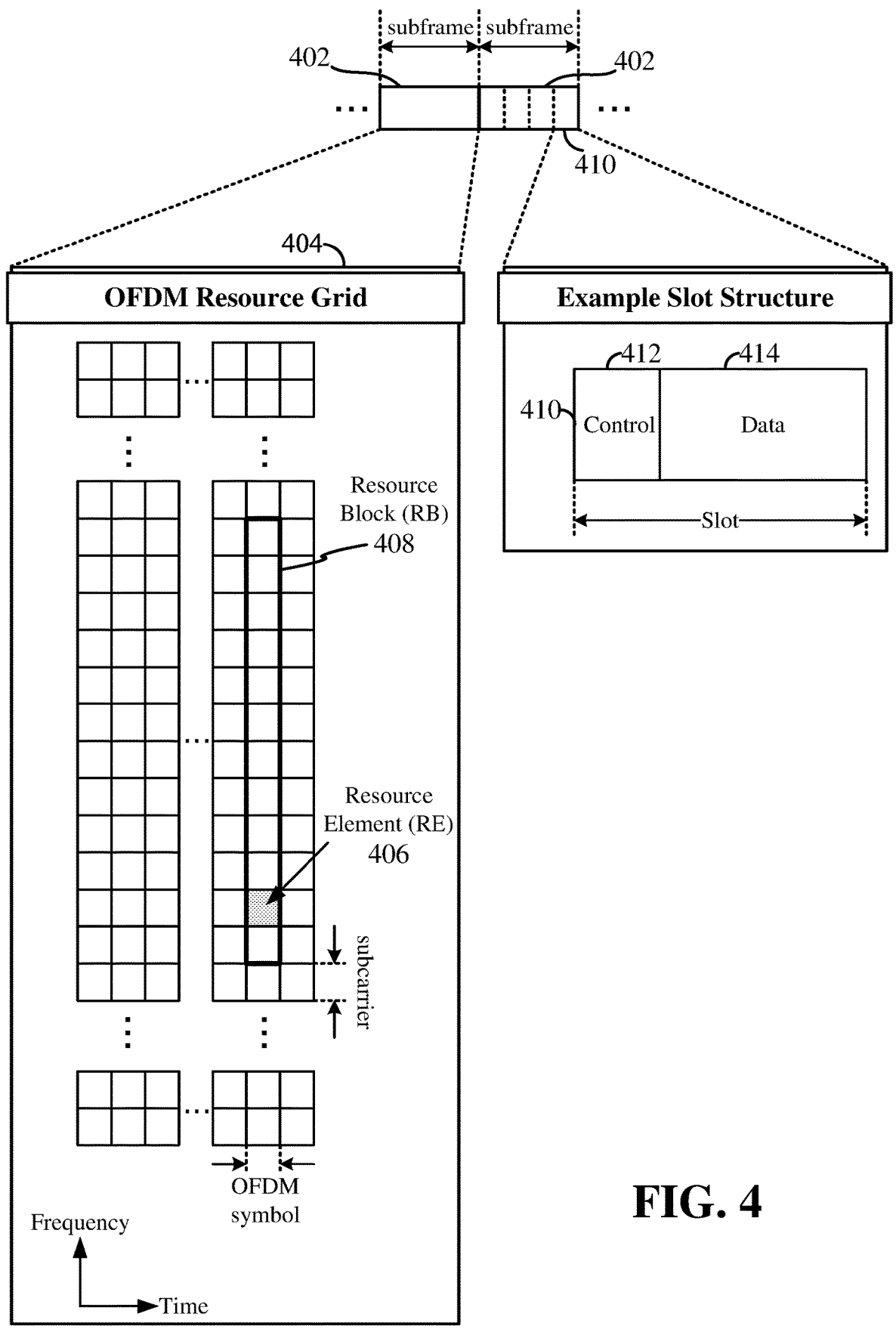
FIG. 4 is a schematic illustration of an organization of wireless resources in an air interface utilizing orthogonal frequency divisional multiplexing (OFDM) according to some embodiments.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 5:
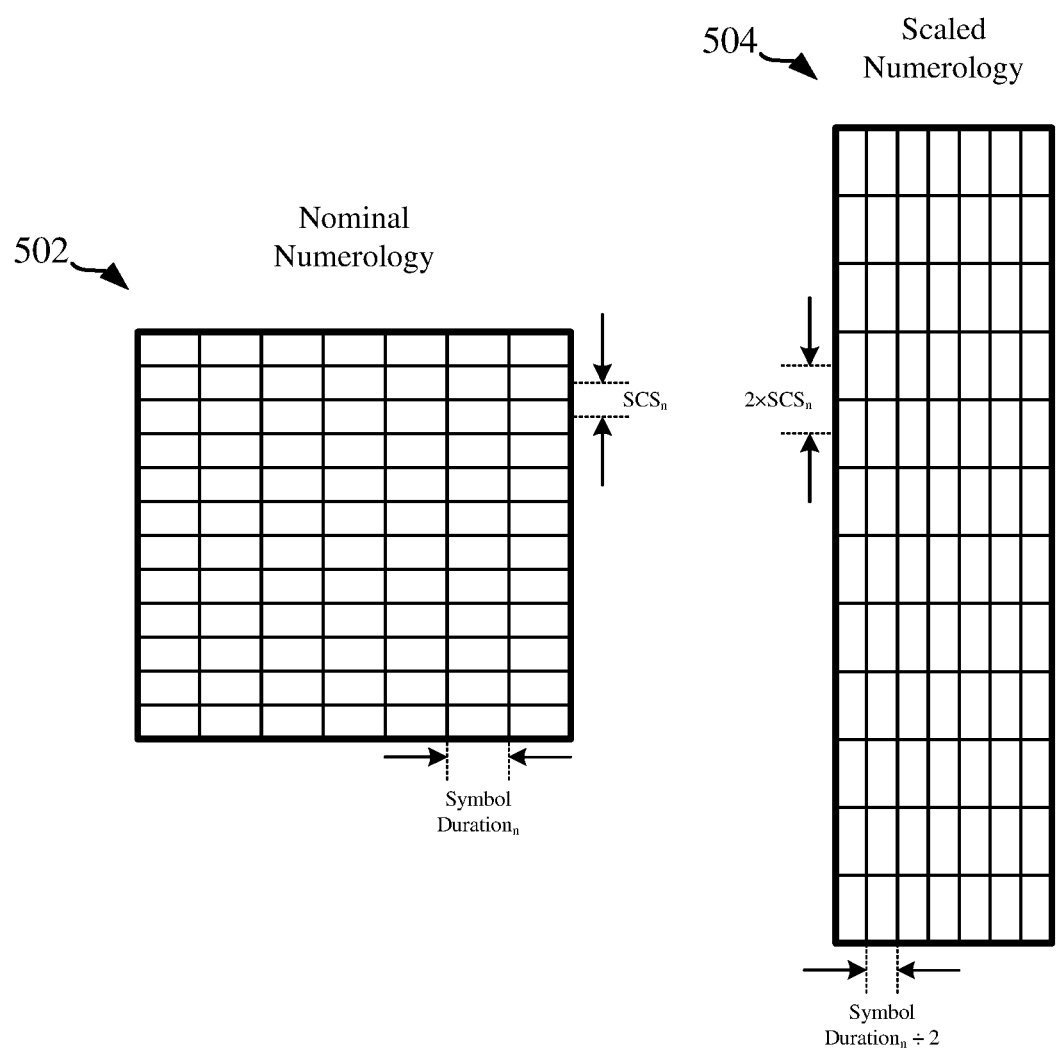
FIG. 5 is a schematic illustration of an OFDM air interface utilizing a scalable numerology according to some aspects of the disclosure.

To illustrate this concept of a scalable numerology, FIG. 5 shows a first RB 502 having a nominal numerology, and a second RB 504 having a scaled numerology. As one example, the first RB 502 may have a 'nominal' subcarrier spacing ($SCS_n$) of 30 kHz, and a 'nominal' symbol duration$_n$ of 333 μs. Here, in the second RB 504, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 504, the scaled numerology includes a scaled symbol duration of half the nominal symbol duration, or (symbol duration$_n$)÷2=167 μs.

In higher operating bands (e.g., greater than 75 GHZ) in NR, larger bandwidths are generally used because larger bandwidths may provide high spectral efficiency and/or higher data rates than the lower bandwidths associated with traditional NR operating bands (e.g., 600 MHZ to 39 GHZ). However, utilizing larger bandwidths may be associated with several issues, as follows, for example. One issue may be that a higher frequency causes a larger pathloss, thereby causing a faster signal loss. In order to address this issue, one of the waveform implementations described below may be utilized for a downlink operation. Different waveform implementations have different strengths and weaknesses, and thus a selection of a waveform implementation may depend on various conditions.

In an example, a single carrier frequency domain implementation (e.g., DFT-s-OFDM) may be utilized for the larger bandwidths. The single carrier frequency domain implementation (e.g., single carrier quadrature amplitude modulation (SC-QAM)) may provide a relatively low Peak-to-Average Power Ratio (PAPR), resulting in an improved coverage and an increased transmit power. The single carrier frequency domain implementation may further provide a single tap frequency domain equalizer (FDE). The single carrier frequency domain implementation may also provide an efficient bandwidth utilization, as no guard band may be needed. However, the single carrier frequency domain implementation may involve fast Fourier transform calculations, which may contribute to a higher complexity in the implementation than calculations that only involve time-domain calculations.

In an example, a single carrier time domain implementation may be utilized for the larger bandwidths. The single carrier time domain implementation provides a lower PAPR than the single carrier frequency domain implementation, and thus provides a better coverage than the single carrier frequency domain implementation. The single carrier time domain implementation provides a lower complexity than the single carrier frequency domain implementation, e.g., because the single carrier time domain implementation does not involve fast Fourier transform or inverse fast Fourier transform calculations. Further, in the single carrier time domain implementation, a cyclic prefix (CP) may be added to allow for an FDE implementation (e.g., using a single carrier FDE (SC-FDE)). However, a MIMO implementation and/or FDM may be difficult while utilizing the single carrier time domain implementation.

In an example, an OFDM implementation may be utilized for the larger bandwidths. The OFDM implementation may provide a higher PAPR than the single carrier frequency domain implementation or the single carrier time domain implementation, and thus the coverage may be worse for the OFDM implementation. On the other hand, the OFDM implementation may provide a high signal-to-noise ratio (SNR) and a high spectral efficiency. Further, the OFDM implementation may provide a high order MIMO to achieve an extremely high data rate, as well as a single tap FDE. In addition, the OFDM implementation may provide an efficient bandwidth utilization, as no guard band may be needed, and may further provide an easy FDM capability.

For random access processes in NR, there are two types of random access channel (RACH) processes, including a type-1 RACH process and a type-2 RACH process.

The 4-step RACH process includes communication of a message 1 (Msg1), a message 2 (Msg2), a message 3 (Msg3), and a message 4 (Msg4). The Msg1 is a UL communication that may include a PRACH preamble, and the Msg2 is a DL communication that may include a random access response (RAR). The Msg3 is a UL communication that may include a PUSCH message, and the Msg4 is a DL communication that may include a contention resolution message.

Figure 6:
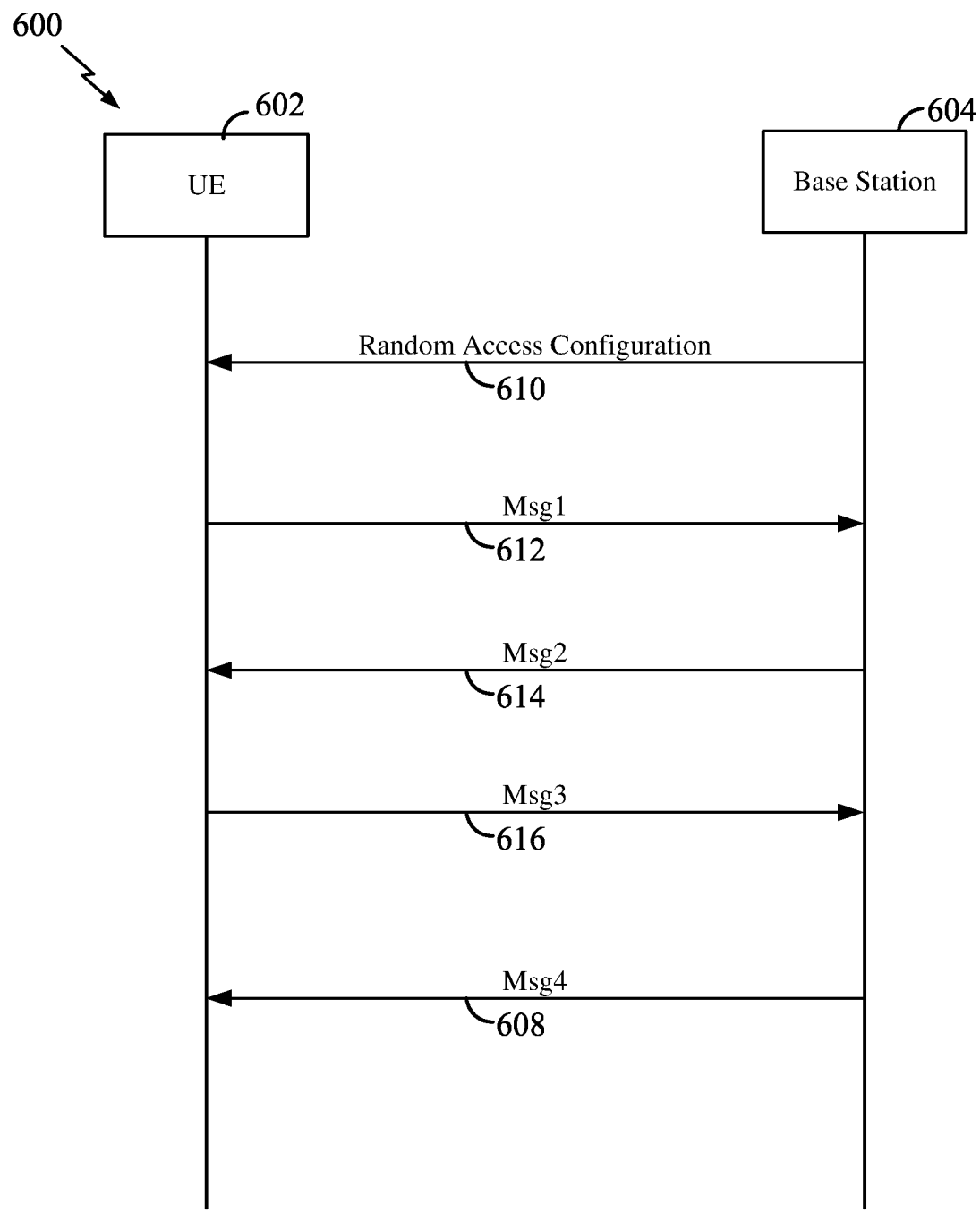
FIG. 6 is an example diagram illustrating a 4-step random access channel (RACH) process, according to some aspects.

FIG. 6 is an example diagram 600 illustrating a 4-step RACH process, according to some aspects. The 4-step RACH process may involve a UE 602 and a base station 604. At 610, the base station 604 may transmit a random access configuration to the UE 602. For example, the random access configuration may be transmitted to the UE 602 via a system information block (SIB). At 612, the UE 602 may determine a RACH preamble for the RACH procedure 400 and may transmit the RACH preamble via a Msg1 to the base station 402, based on the random access configuration. For example, the UE 602 may transmit the Msg1 in a RACH occasion. Based on the Msg1, the base station 604 at 614 may generate and transmit a Msg2 to the UE 602, where the Msg2 may include the RAR. For uplink timing transmission, the base station 604 may determine a timing advance and/or a UL grant to be included in the Msg2.

In response to the Msg2, the UE 602 at 616 transmits an Msg3, which may include a PUSCH message. For example, the information in the Msg3 may be carried on an uplink data channel (e.g., based on the UL grant in the Msg2), such as a PUSCH. The Msg3 may also be known as an RRC connection request message and/or a scheduled transmission message. Based on the Msg3, the base station 604 at 618 may generate and transmit a Msg4 to the UE 602, where the Msg4 may include a contention resolution message.

The 2-step RACH process may include communication of two messages, a message A (MsgA) and a message B (MsgB). The MsgA includes a preamble portion and a payload portion. The preamble portion may be equivalent to the Msg1 of the 4-step RACH process and the payload portion may be equivalent to the Msg3 of the 4-step RACH process. Hence, the MsgA may be considered as a combination of the Msg1 and Msg3 from the 4-step RACH process. The MsgB may include the Msg2 and the Msg4 of the 4-step RACH process.

The 2-step RACH process may provide the following advantages over the 4-step RACH process. The 2-step RACH process may reduce the latency and signaling overhead associated with the 4-step RACH process. The 2-step RACH process may allow small UL packet transmissions that may not require timing advance (TA) or a grant. The 2-step RACH process may improve the capacity and power efficiency when compared to the contention based random access (CBRA) of the 4-step RACH process.

Figure 7:
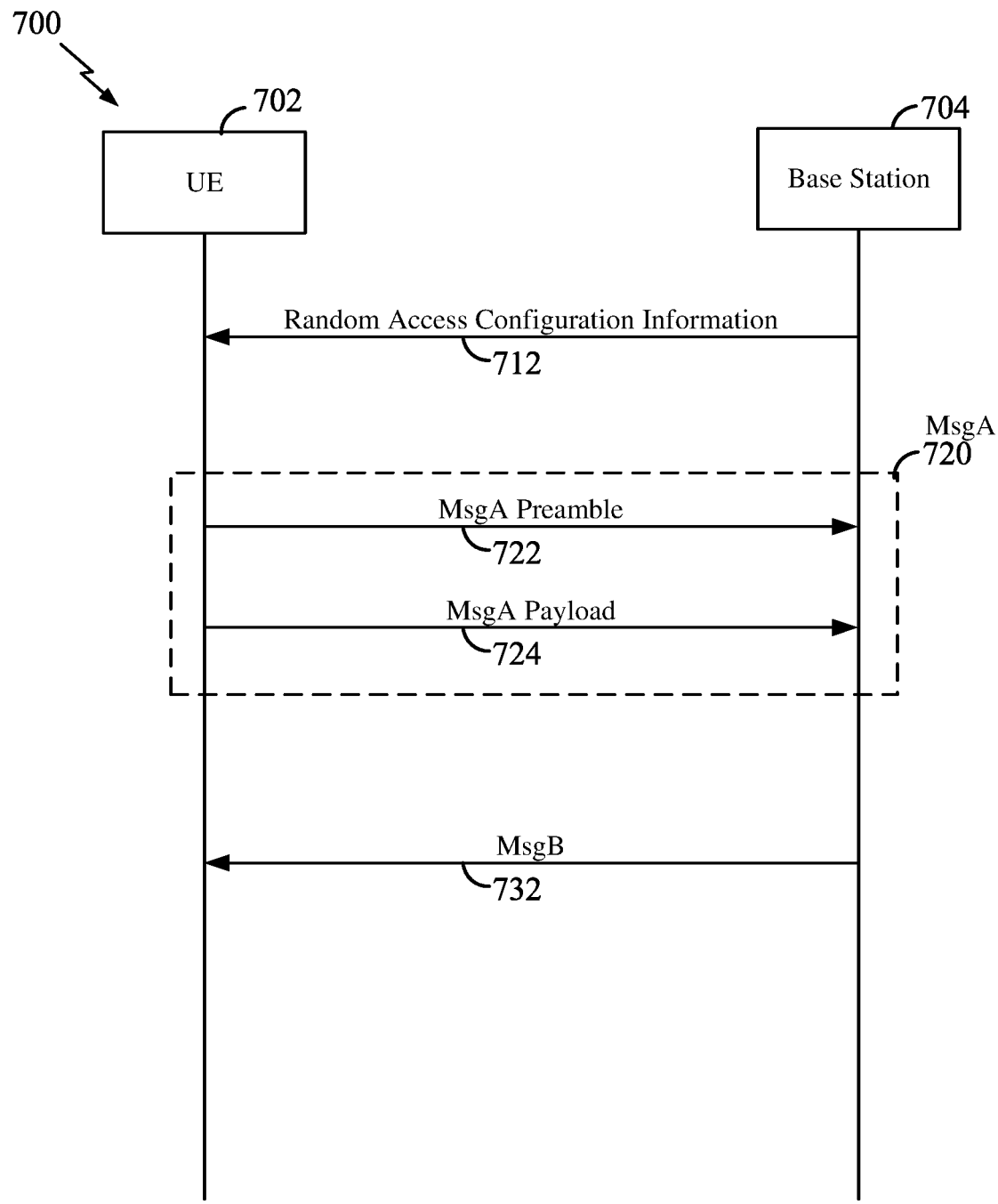
FIG. 7 is an example diagram illustrating a 2-step RACH process, according to some aspects.

FIG. 7 is an example diagram 700 illustrating a 2-step RACH process, according to some aspects. The 2-step RACH process may involve a UE 702 and a base station 704. Prior to the two-step RACH process, the UE 702 may receive a random access configuration information 712 from the base station 704, which includes a random access configuration to configure the UE 702 for the 2-step RACH process. For example, the UE 702 may receive an SSB, a SIB, and/or a reference signal broadcast by the base station 704, which may carry the random access configuration information. The UE may process these signals and channels and determine the random access configuration for the two-step RACH. For example, the UE 702 may determine downlink synchronization, decoding information, and/or other measurement information for random access with the base station 704, based on the random access configuration. After obtaining the random access configuration information, the UE 702 may generate and transmit a MsgA, at 720. The transmission of the MsgA at 720 may include a transmission of a preamble portion at 722 and a transmission of a payload portion at 724. After receiving the MsgA, the base station 704 may process the preamble portion and the payload portion, and send a MsgB to the UE 702, at 732.

The UE may send the MsgA's preamble portion including the PRACH message to the base station on one or more RACH occasions (ROs). A RO is a time/frequency set of resources. A RACH slot may repeat every RACH configuration period.

One SSB may be associated with one or more ROs or more than one SSB may be associated with one RO. The association between an SSB and an RO may be used for the base station to determine which beam is used by the UE to communicate on the RO. In an example, the association between an SSB and an RO may be done in a frequency domain, then in a time domain within a RACH slot.

The UE acquiring an SSB from the base station may randomly select one of the ROs associated with the acquired SSB and send the PRACH message of the MsgA on the selected RO associated with the acquired SSB. In an aspect, all ROs associated with the acquired SSB may have an equal probability of being selected by the UE. For example, the UE may receive an SSB and the randomly select one of the ROs associated with the received SSB, such that when the base station receives a communication associated with the RACH process, the base station may know which SSB is used by the UE for the communication. Because each RO is associated with a respective SSB and each beam may be associated with a respective SSB, the base station may determine which beam of the base station is received by the UE based on an RO where a PRACH message of the MsgA was received. In an example, the association between an SSB and respective ROs may be signaled to the UE in a SIB (e.g., SIB1).

Figure 8:
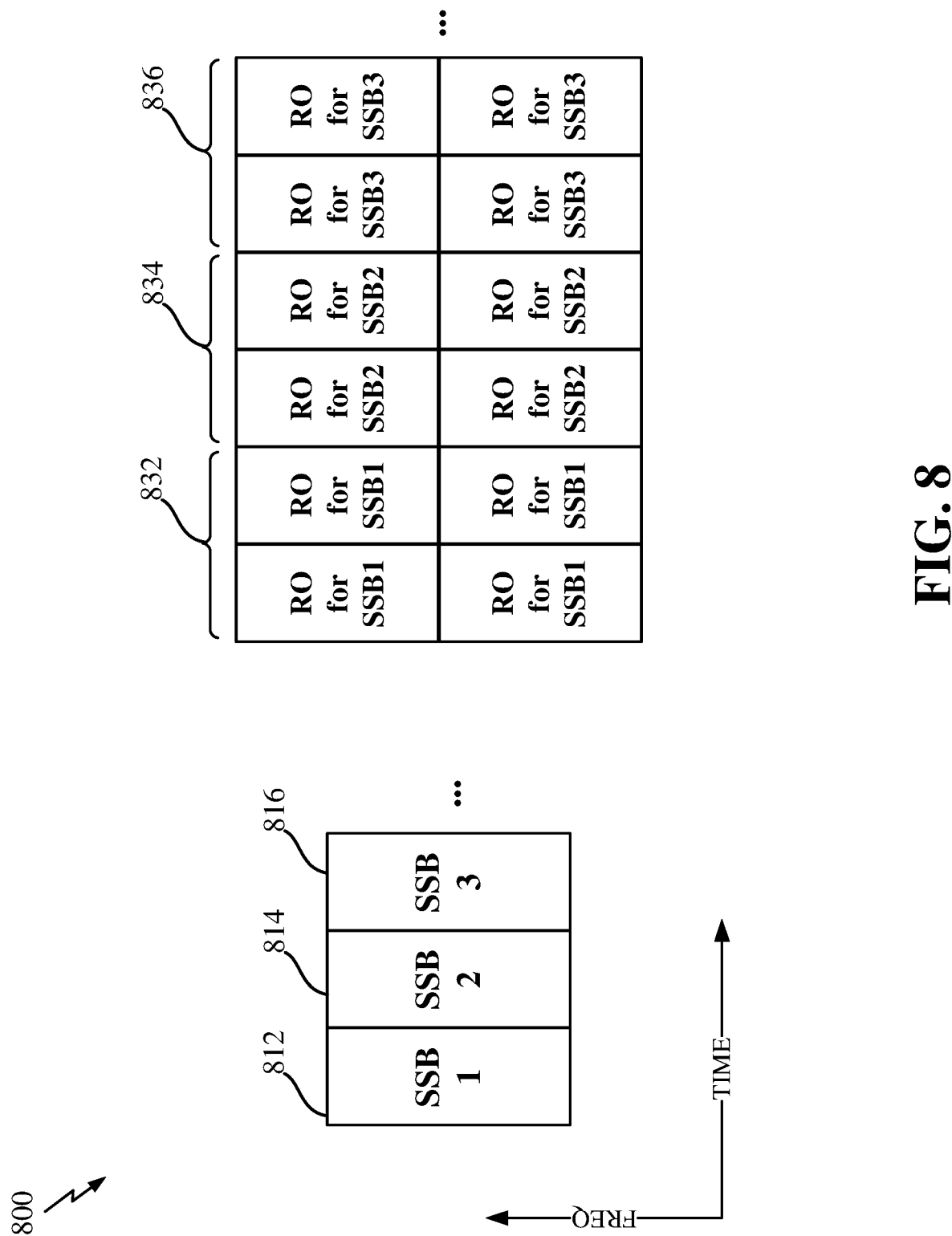
FIG. 8 is an example diagram illustrating SSBs associated with respective RACH occasions (ROs), according to some aspects.

FIG. 8 is an example diagram 800 illustrating SSBs associated with respective ROs, according to some aspects. In the example of FIG. 8, a UE may receive multiple SSBs, such as a first SSB 812, a second SSB 814, and a third SSB 816. In the example of FIG. 8, each SSB is associated with respective four ROs. In particular, the first SSB 812 is associated with four ROs 832 designated for the first SSB, the second SSB 814 is associated with four ROs 834 designated for the second SSB, and the third SSB 816 is associated with four ROs 836 designated for the third SSB. As shown in FIG. 8, each of the ROs spans over time and frequency. The first SSB 812, the second SSB 814, and the third SSB 816 may be associated respectively with a first beam, a second beam, and a third beam of the base station. Hence, for example, if a base station receives the MsgA on one of the four ROs 832 for the first SSB, then the base station may determine that the UE received the first SSB 812 using the first beam based on the use of one of the four ROs 832 to receive the MsgA.

The UE may transmit the payload portion of the MsgA on one or more PUSCH occasions (POs). A PO is a time/frequency set of resources. The payload portion may include a PUSCH message and a DMRS. In an aspect, one RO may be associated with one PO, or multiple ROs may be associated with one PO, where the association between a PO and RO(s) may be configured at the UE by the base station. In an aspect, a PUSCH configuration (e.g., FDRA, TDRA, DMRS, MCS, etc.) may be pre-signaled to the UE (e.g., semi-statically), while the DMRS may be a contention-based signal.

In an aspect, ROs of two preamble groups (e.g., group A and group B) may be configured with mappings to different POs.

Figure 9:
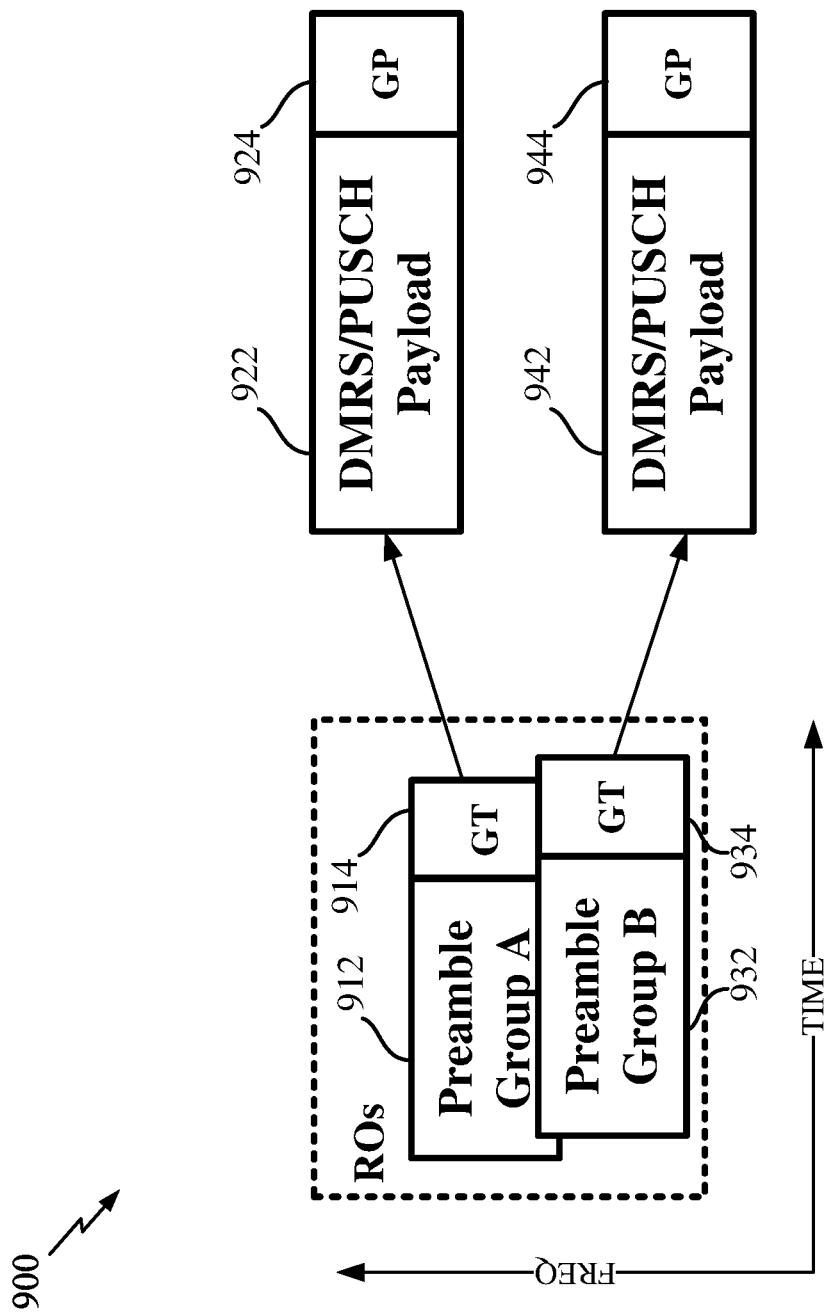
FIG. 9 is an example diagram illustrating mapping between two preamble groups of ROs mapped to different PUSCH occasions (POs), according to some aspects.

FIG. 9 is an example diagram 900 illustrating mappings between two preamble groups of ROs mapped to different POs, according to some aspects. A first RO 912 of a preamble group A for carrying a preamble portion may be mapped to a first PO 922 for carrying a payload portion. A guard time 914 may occur after the first RO 912, and a guard period 924 may occur after the first PO 922. A second RO 932 of a preamble group B for carrying a preamble portion may be mapped to a second PO 942 for carrying a payload portion. A guard time 934 may occur after the second RO 932, and a guard period 944 may occur after the second PO 942.

A time gap may be allocated between a communication of the preamble portion and a communication of the payload portion of the MsgA, in order to allow for sufficient time to make configuration changes (e.g., changes to SCS, a BW, etc.) between a transmission of a PRACH message and a transmission of a PUSCH message. For example, the time gap may be 2 symbols for $\mu=0$ (15 kHZ) or may be 4 symbols for $\mu=2$ or 3 (30 kHZ).

Figure 10A:
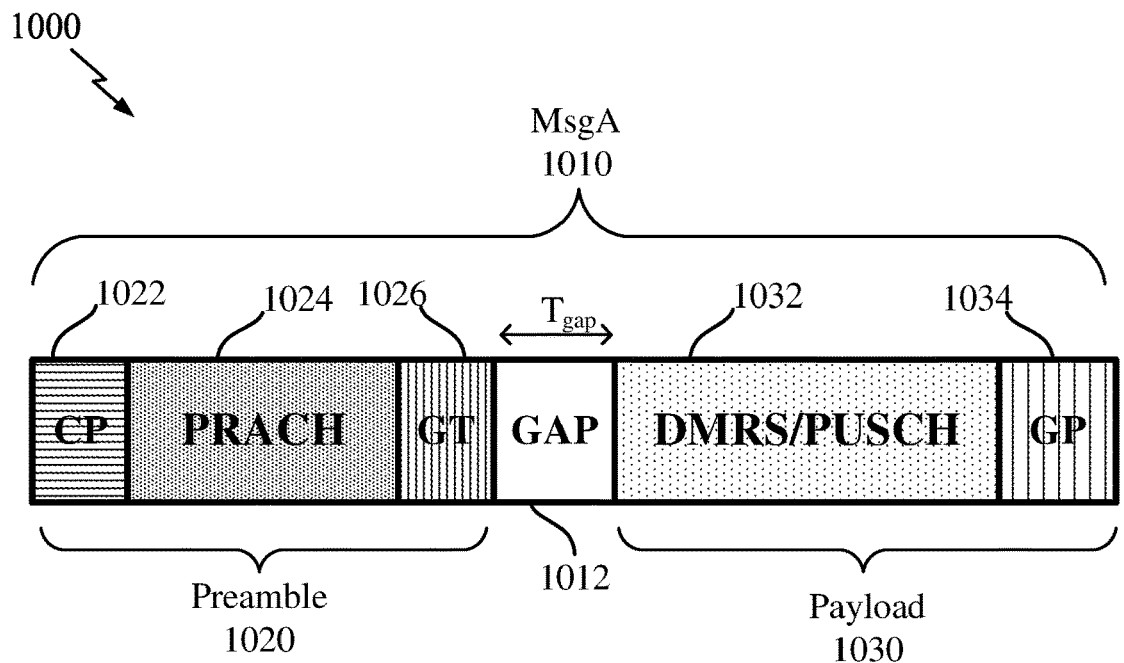
FIG. 10A is an example diagram illustrating a structure of the MsgA, according to some aspects.

FIG. 10A is an example diagram 1000 illustrating a structure of the MsgA, according to some aspects. The MsgA 1010 may include a preamble portion 1020 and a payload portion 1030, with a gap time 1012 between the preamble portion 1020 and the payload portion 1030. The preamble portion 1020 may include a CP 1022, a PRACH message 1024, and a guard time (GT) 1026. The payload portion 1030 may include a PUSCH message 1032 and a guard period (GP) 1034.

Prior to completion of the RACH process, different UEs may not be synchronized to each other in time and frequency. Hence, to account for different arrival times for different UEs during the communication of the MsgA, a guard period (e.g., in symbols) in time may be configured between POs that are frequency-division multiplexed. Further, in an example, to account for frequency offsets between different UEs during the communication of the MsgA, a guard band (e.g., 1 RB) may be configured/included between POs that are frequency-division multiplexed. In another example, no guard band may be configured between POs that are frequency-division multiplexed.

Figure 10B:
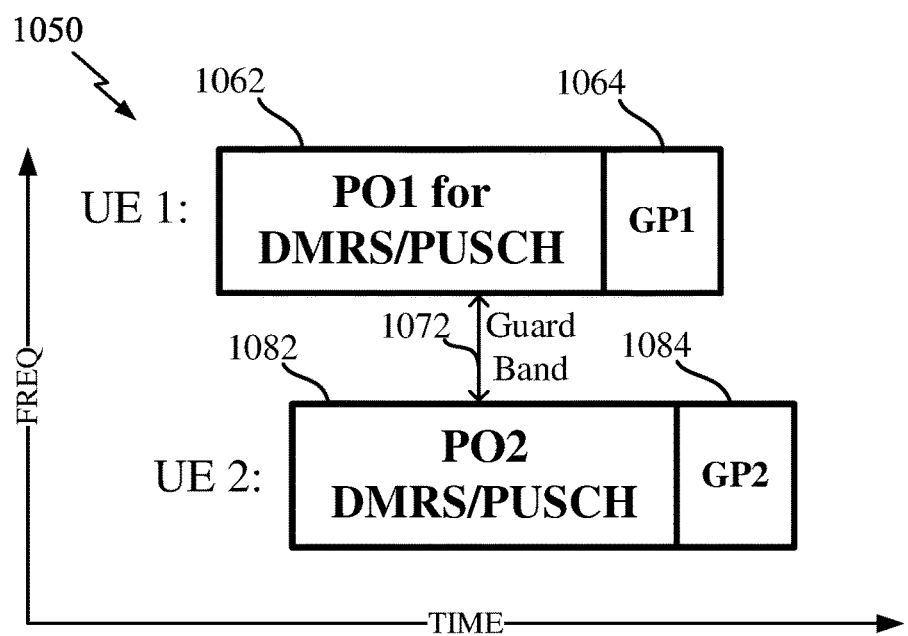
FIG. 10B is an example diagram illustrating POs for two different UEs, with a guard band between the POs, according to some aspects.

FIG. 10B is an example diagram 1050 illustrating POs for two different UEs, with a guard band between the POs, according to some aspects. In FIG. 10B, a first UE (UE 1) may transmit a PUSCH message on a first PO 1062, and a first guard period 1064 is allocated after the transmission of the PUSCH message during the first PO 1062. Further, in FIG. 10B, a second UE (UE 2) may transmit a PUSCH message on a second PO 1082 at a later time than the transmission of the PUSCH message by the first UE, and a second guard period 1084 is allocated after the transmission of the PUSCH message during the second PO 1082. A guard band 1072 may be included between the first PO 1062 and the second PO 1082.

When the higher operating bands (e.g., greater than 75 GHZ) are utilized in NR, to manage PAPR and complexity, single carrier waveforms may be used for communication between the UE and the base station. In an example, the single carrier waveforms may be similar to a single-carrier frequency domain equalization SC-FDE as used in IEEE 802.11ad/ax. For communications using the single carrier waveforms, the signals may be time-division multiplexed. Because the signals for the single carrier waveforms are wide-band signals, these signals are generally not frequency-division multiplexed. A DMRS with a PUSCH message may not be frequency-division multiplexed for the SC-QAM and/or the SC-FDE. The DMRS with the PUSCH message may be frequency-division multiplexed for DFT-s-OFDM, which may cause a higher PAPR impact. For example, in a communication of the MsgA of the two-step RACH process with the DFT-s-OFDM, a DMRS for a PUSCH message may be frequency-division multiplexed, such that the tones for the DMRS may be interlaced with the tones for the PUSCH message. However, the frequency-division multiplexing may not be possible with the single carrier waveforms because the single carrier waveforms utilize a single band.

The PRACH message in the preamble portion is a sequence used for time and frequency synchronization, and the DMRS in the payload portion is another sequence used for channel estimation for a coherent demodulation of the PUSCH message in the payload portion. As discussed above, when the single carrier waveforms are used, the signals may not be frequency-division multiplexed, but may be time-division multiplexed. Although both the sequence of the PRACH message and the sequence of the DMRS are necessary when signals are frequency-division multiplexed, one of these two sequences may be used when signals are time-divisional multiplexed (e.g., because these two sequences are back-to-back in time). Therefore, in a single carrier waveform design that time-division multiplexes the signals, one of the two sequences may be used instead of using both sequences, which may reduce overhead in communicating the signals. Further, because the single carrier waveform design does not provide an OFDM/DFT-s-OFDM grid structure based on a tone-by-symbol structure, a different structure for ROs and POs for the single carrier waveform design is provided, as discussed in more detail below.

In addition, it takes time for the base station to switch from one beam to another beam. This beam switching may be done between consecutive ROs and consecutive POs associated with different SSBs. For example, referring back to FIG. 8, the base station may switch from the first beam associated with the first SSB 812 to the second beam associated with the second SSB 814 when changing from the first ROs 832 associated with the first SSB 812 to the second ROs 834 associated with the second SSB 814, and this beam switching takes some time. When the higher operating bands (e.g., greater than 75 GHZ) are not utilized in NR, a length of a CP in time is generally long enough to account for the beam switching time for switching between two different beams, and thus an additional time gap may not be necessary. On the other hand, when the higher operating bands are utilized, the length of CP in time may become significantly shorter than the beam switching time, due to the following reasons. When the higher operating bands are used, SCS may be increased to compensate for a phase noise and to increase the overall channelization bandwidth with a manageable FFT size. As the SCS increases, the symbol time and the length of the CP decreases proportionally. Further, when the higher operating bands are used, smaller cell sizes may be used due to higher path loss for the higher operating bands, which may cause smaller delay spreads and thus a smaller CP size. Although the guard period in some formats may be used to account for receiving communications from UEs in different locations within the coverage of the base station, the guard period may not be long enough to account for the beam switching time and/or may not be suitable for beam switching tasks that may interfere with communications from the UEs during the guard period. For the above reasons, when the higher operating bands are not utilized in NR, the CP may not be large enough to compensate for the UL beam switching time, and thus a longer time gap may be necessary, which contributes to additional overhead.

Various aspects of the disclosure may address the above-described issues related to communication of the MsgA of the 2-step RACH process when the single carrier waveforms for the higher operating bands are used. According to some aspects of the disclosure, in the 2-step RACH process, a base station may configure a UE such that the UE may transmit a MsgA including a PRACH message and a PUSCH message, using a single carrier waveform, while excluding a DMRS from the MsgA when certain conditions are satisfied. As such, the base station may utilize the sequence of the PRACH message for the channel estimation, instead of utilizing a sequence of a DMRS. In other words, the sequence of the PRACH message may be utilized for the time and frequency synchronization as well as for the channel estimation. Because the communication of the MsgA may not involve a communication of a DMRS, overhead and resources may be reduced. For example, the UE may be a UE as illustrated in any one or more of FIGS. 1, 2, and/or 3 and the base station may be a base station as illustrated in any one or more of FIGS. 1, 2, and/or 3.

Hence, according to some aspects of the disclosure, the base station may determine a random access configuration to configure one or more UEs with the two-step RACH process, where the two-step RACH process includes a communication of a MsgA including a preamble portion including a PRACH message and further includes a payload portion including a PUSCH message, where the random access configuration may be determined such that a DMRS is excluded from the payload portion when one or more conditions are satisfied. Subsequently, the base station may generate configuration information including the random access configuration indicating the two-step RACH process and transmit the configuration information to one or more UEs, where the configuration information may include a configuration for a transmission of the preamble portion and a transmission of the payload portion without the DMRS based on the satisfaction of one or more conditions.

After the UE receives the configuration information from the base station, the UE may configure the UE with the two-step RACH process based on the configuration information received from the base station. Subsequently, the UE may generate and transmit an MsgA based on the configuration information, using the single carrier waveform, where the transmission of the MsgA may include a transmission of a preamble portion and a transmission of a payload portion. After receiving the MsgA, the base station may process the preamble portion and the payload portion, and send a MsgB to the UE.

In an aspect, the satisfaction of the one or more conditions may be achieved by satisfying one or more of the following five conditions, including first, second, third, fourth, and fifth conditions. For example, the following conditions may be related to maintaining a phase continuity between a transmission of the preamble portion and the payload portion, to be able to reliably utilize the channel estimation of the sequence of the PRACH message for the PUSCH message. Although the following five conditions are provided as an example, more than five conditions may be used in another example. In one scenario, satisfaction of less than five of the following five conditions may be sufficient to determine to exclude the DMRS from the payload portion of the MsgA. In this scenario, in some aspects, if all of the following conditions are not satisfied, the DMRS may not be excluded from the payload portion. In another scenario, all of the following five conditions need to be satisfied to determine to exclude the DMRS from the payload portion. In this scenario, in some aspects, if at least one of the followings conditions is not satisfied, the DMRS may not be excluded from the payload portion.

In an aspect, the first condition may be satisfied when the base station configures a bandwidth for the preamble portion to be greater than or equal to a bandwidth for the payload portion. For example, because the sequence of the PRACH message is utilized for the channel estimation, in order to reliably obtain the channel estimation that accounts for a bandwidth of the PUSCH message, the bandwidth for the preamble portion including the PRACH message needs to be greater than or equal to the bandwidth for the payload portion including the PUSCH message.

In an aspect, according to the first condition, if the bandwidth for the preamble portion (e.g., PRACH message) is equal to the bandwidth for the payload portion (e.g., PUSCH message), the channel estimation may be performed using the bandwidth for the preamble portion, which overlaps with the bandwidth for the payload portion in frequency. On the other hand, if the bandwidth for the preamble portion (e.g., PRACH message) is greater than the bandwidth for the payload portion (e.g., PUSCH message), the channel estimation may be performed using the part of the bandwidth for the preamble portion that overlaps with the bandwidth for the payload portion in frequency. Further, if the bandwidth for the preamble portion is greater than the bandwidth for the payload portion, in order to ensure phase continuity, the configuration information may indicate that RF switching is not to be performed between the transmission of the preamble portion and the transmission of the payload portion. Hence, for example, the UE may be configured such that the UE RF bandwidth stays the same for the preamble portion and the payload portion. The UE may be configured to utilize the greater bandwidth of the two different bandwidths for the preamble portion and the preload portion, such that if the bandwidth for the preamble portion is configured to be greater than the bandwidth for the payload portion, the bandwidth for the preamble portion may be used. For example, if the bandwidth for the PRACH message is greater than the bandwidth for the PUSCH message, the UE may be configured (e.g., by the configuration information) such that the UE RF bandwidth is set to the bandwidth for the PRACH message, in order to be able to sufficiently cover both the bandwidth for the PRACH message and the bandwidth for the PUSCH message. Then, for the PUSCH message, baseband digital filtering may be used for a portion of the UE RF bandwidth corresponding to the bandwidth for the PUSCH message, which does not change the phase and thus maintains the phase continuity.

A second condition may be satisfied when the base station configures a UE radio frequency (RF) configuration for a transmission of the preamble portion to be the same as a UE RF configuration for a transmission of the payload portion. For example, in order to maintain the phase continuity for the transmissions of the preamble portion and the payload portion, the UE RF configuration may stay the same in terms of the frequency locations for the resources as well as with respect to the bandwidth.

A third condition may be satisfied when the base station configures a time elapsed between the transmission of the preamble portion and the transmission of the payload portion to be less than an elapsed time threshold. In an aspect, the elapsed time threshold may be a coherence time. The coherence time may be a time duration during which a channel response is assumed to be constant. Hence, if the time elapsed is greater than or equal to the coherence time, there is a high likelihood of the channel responses varying and thus the channel estimations using the sequence of the PRACH message may not be reliably utilized for the PUSCH message. In an example, the coherence time may be based on a speed of a movement of a UE, where a slow-moving UE may be configured with a higher coherence time while a fast-moving UE may be configured with a lower coherence time (e.g., as compared to the higher coherence time of the slow-moving UE).

A fourth condition may be satisfied when the base station configures, if a DFT-s-OFDM waveform is used, a subcarrier spacing associated with resources for the transmission of the preamble portion to be the same as a subcarrier spacing associated with resources for the transmission of the payload portion. For example, switching a numerology or the subcarrier spacing may result in changes in frequency, and thus the phase continuity may not be maintained.

A fifth condition may be satisfied when the base station configures a transmission power for the transmission of the preamble portion to be the same as a transmission power for the transmission of the payload portion. For example, if the transmission powers for the preamble portion and for the payload portion are different, the phase continuity may not be maintained.

Figure 11:
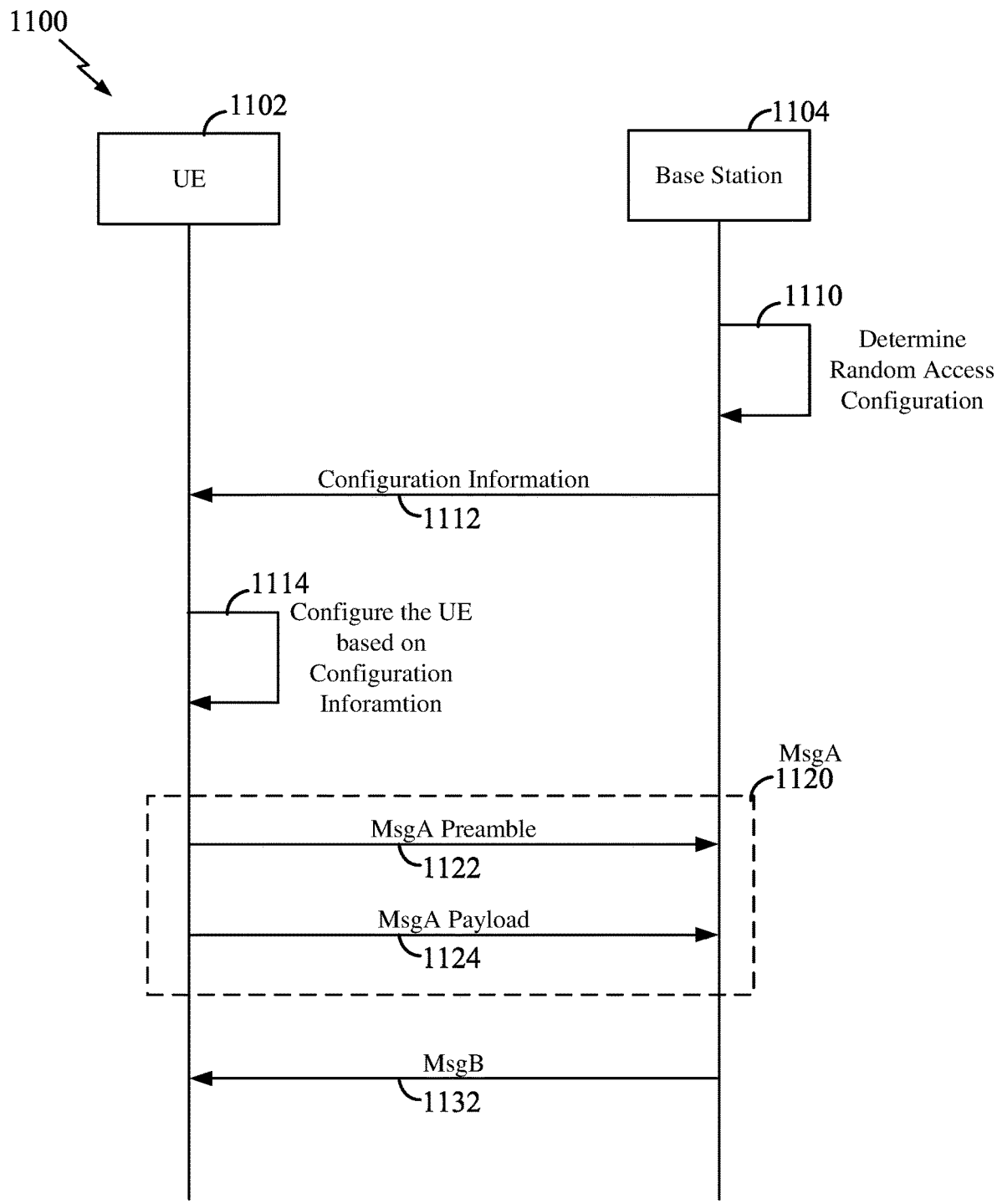
FIG. 11 is an example diagram illustrating a 2-step RACH process using a single carrier waveform, according to some aspects.

FIG. 11 is an example diagram 1100 illustrating a 2-step RACH process using a single carrier waveform, according to some aspects. The 2-step RACH process may involve a UE 1102 and a base station 1104. For example, the UE 1102 may be a UE as illustrated in any one or more of FIGS. 1, 2, and/or 3, and the base station 1104 may be a base station as illustrated in any one or more of FIGS. 1, 2, 3 and/or 7. Prior to the two-step RACH process, at 1110, the base station 1104 may determine a random access configuration to configure one or more UEs, such as the UE 1102, with a two-step RACH process, where the two-step RACH process includes a communication of a MsgA including a preamble portion including a PRACH message and further includes a payload portion including a PUSCH message. The base station 1104 may determine the random access configuration at 1110 such that a DMRS is excluded from the payload portion based on satisfaction of one or more conditions. At 1112, the base station 1104 may generate configuration information, including the random access configuration indicating the two-step RACH process, and transmit the configuration information to one or more UEs, such as the UE 1102. The configuration information may include a configuration for a transmission of the preamble portion and a transmission of the payload portion without the DMRS based on the satisfaction of one or more conditions. In an aspect, the configuration information may be transmitted at 1112 via an SSB, an SIB, and/or a reference signal broadcast by the base station 1104.

At 1114, after receiving the configuration information from the base station 1104, the UE 1102 may configure itself with the two-step RACH process based on the configuration information received from the base station 1104. In an example, when the UE 1102 receives the configuration information from the base station 1104, the UE 1102 may process these signals and channels and determine the random access configuration for the two-step RACH. For example, the UE 1102 may determine downlink synchronization, decoding information, and/or other measurement information for random access with the base station 1104, based on the random access configuration. After configuring the UE 1102 based on the configuration information, the UE 1102 may generate and transmit an MsgA, at 1120, based on the configuration information, using the single carrier waveform. The transmission of the MsgA at 1120 may include a transmission of a preamble portion at 1122 and a transmission of a payload portion at 1124. After receiving the MsgA, the base station 1104 may process the preamble portion and the payload portion, and send a MsgB to the UE 1102, at 1132.

According to some aspects, if a bandwidth and a frequency range for the preamble portion are the same as a bandwidth and a frequency range for the payload portion, a time gap may not be necessary between the preload portion and the payload portion of the MsgA. This is because no switching for the bandwidth and/or the frequency occurs in this case and thus there is no time delay associated with the switching. Hence, in this aspect, when the base station determines that the bandwidth and the frequency range for the preamble portion are the same as the bandwidth and the frequency range for the payload portion, generating the configuration information by the base station may include generating scheduling information to schedule the transmission of the payload portion to occur immediately after the transmission of the preamble portion. For example, if the bandwidth and the frequency range for the preamble portion are the same as the bandwidth and the frequency range for the payload portion, the second condition described above may also be satisfied.

Figure 12A:
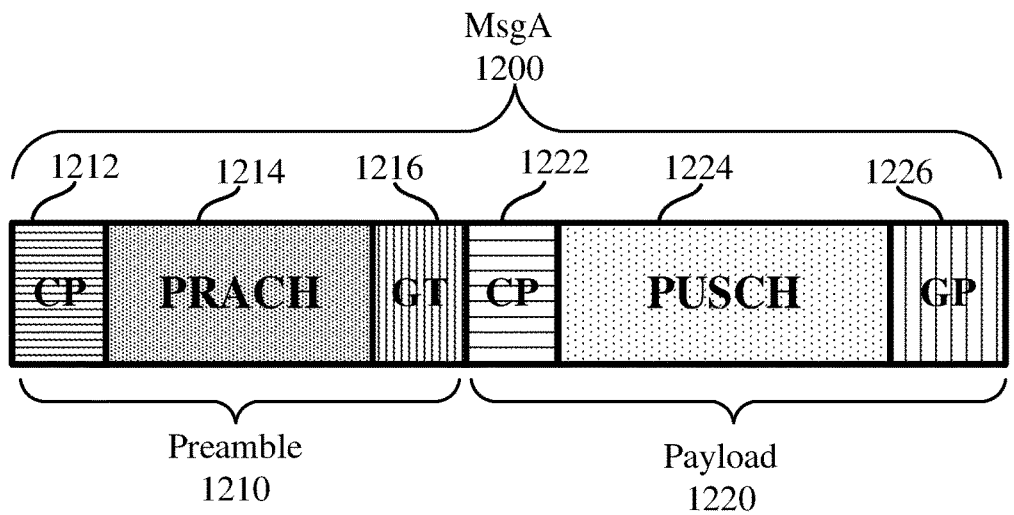
FIG. 12A is an example diagram illustrating a structure of a MsgA, according to some aspects.

FIG. 12A is an example diagram illustrating a structure of a MsgA 1200, according to some aspects. The MsgA 1200 may include a preamble portion 1210 and a payload portion 1220. The preamble portion 1210 may include a CP 1212, a PRACH message 1214, and a GT 1216. The payload portion 1220 may include a CP 1222, a PUSCH message 1224 and a GP 1226. In the example shown in FIG. 12A, the base station has determined that a bandwidth and a frequency range for the preamble portion 1210 are the same as a bandwidth and a frequency range for the payload portion 1220, and thus the base station generates scheduling information to schedule the transmission of the payload portion 1220 to occur immediately after the transmission of the preamble portion 1210, without a time gap between the preamble portion 1210 and the payload portion 1220.

Figure 12B:
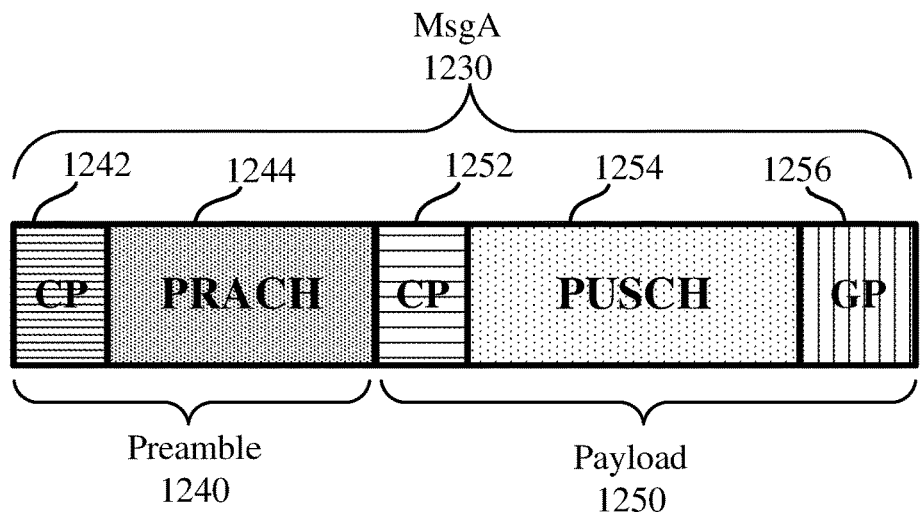
FIG. 12B is an example diagram illustrating a structure of a MsgA when a length of a CP of the payload portion is configured to be greater than or equal to a length of a CP of the preamble portion, according to some aspects.

In an aspect, if the transmission of the payload portion is scheduled to occur immediately after the transmission of the preamble portion, without a time gap, the base station may determine whether a length of a CP of the payload portion is to be configured to be greater than or equal to a length of a CP of the preamble portion. If the length of the CP of the payload portion is configured to be greater than or equal to the length of the CP of the preamble portion, the configuration information may include an indication to exclude a guard time in the preamble portion occurring after the PRACH message. FIG. 12B is an example diagram illustrating a structure of a MsgA 1230 when a length of a CP of the payload portion is configured to be greater than or equal to a length of a CP of the preamble portion, according to some aspects. The MsgA 1230 may include a preamble portion 1240 and a payload portion 1250, without a time gap between the preamble portion 1240 and the payload portion 1250. The preamble portion 1240 may include a CP 1242 and a PRACH message 1244, while the payload portion 1250 may include a CP 1252, a PUSCH message 1224 and a GP 1226. In the example of FIG. 12B, the length of the CP 1252 of the payload portion 1250 is configured to be greater than or equal to the length of the CP 1242 of the preamble portion 1240, and thus the preamble portion 1240 may not include a guard time in the preamble portion 1240 occurring after the PRACH message 1244.

Figure 12C:
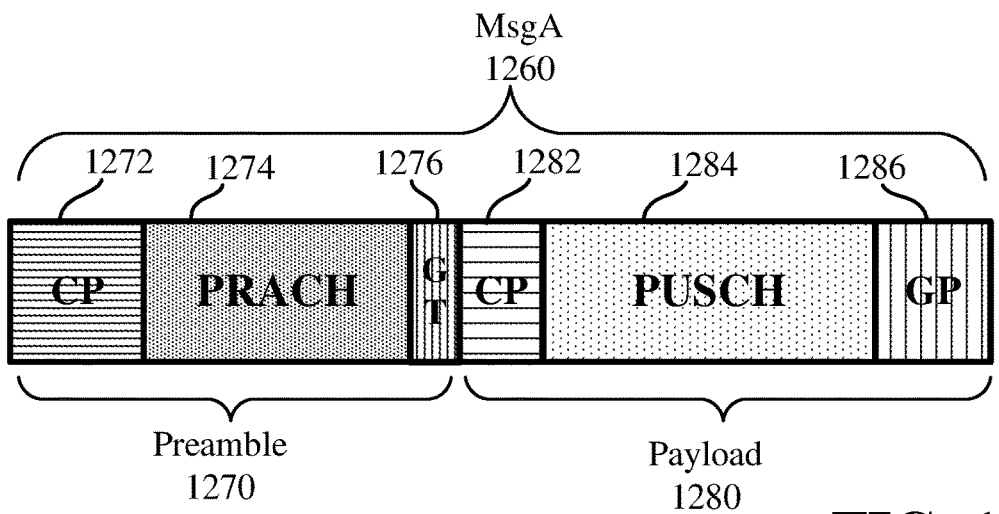
FIG. 12C is an example diagram illustrating a structure of a MsgA when a length of a CP of the payload portion is configured to be shorter than or equal to a length of a CP of the preamble portion, according to some aspects.

On the other hand, if the length of the CP of the payload portion is configured to be shorter than the length of the CP of the preamble portion, the configuration information may include an indication for the UE to include at least one of the guard time in the preamble portion occurring after the PRACH message or a time gap occurring between the preamble portion and the payload portion. FIG. 12C is an example diagram illustrating a structure of a MsgA 1260 when a length of a CP of the payload portion is configured to be shorter than or equal to a length of a CP of the preamble portion, according to some aspects. The MsgA 1260 may include a preamble portion 1270 and a payload portion 1280, without a time gap between the preamble portion 1270 and the payload portion 1280. The preamble portion 1270 may include a CP 1272, a PRACH message 1274, and a guard time (GT) 1276. The payload portion 1280 may include a CP 1282, a PUSCH message 1284 and a GP 1286. In the example of FIG. 12C, the length of the CP 1282 of the payload portion 1280 is configured to be shorter than the length of the CP 1272 of the preamble portion 1270, and thus the preamble portion 1270 may include the guard time 1276 in the preamble portion 1270 occurring after the PRACH message 1274. In an aspect, the guard time 1276 of the preamble portion 1270 may be configured such that the length of the CP 1272 of the preamble portion 1270 is equal or substantially equal to a sum of the guard time 1276 of the preamble portion 1270 and the length of the CP 1282 of the payload portion 1280.

In an aspect, when a guard time exists in the preamble portion after the PRACH message, if the guard time of the preamble portion is long enough to disrupt the phase continuity, the guard time may be removed. In an aspect, to maintain the phase continuity, the lengths of the CPs for the preamble portion and the payload portion may be increased to account for the length of the guard time, and the guard time may be removed. Hence, when the configuration information comprises the indication to exclude the guard time in the preamble portion occurring after the PRACH message, the base station may determine the length of the CP of the preamble portion and the length of the CP of the payload portion based on a length of the guard time. In an aspect, the length of the CP of the preamble portion and the length of the CP of the payload portion may be included in the configuration information.

If multiple ROs and/or multiple POs are configured and the UE randomly selects an RO from the multiple ROs and/or a PO from the multiple POs, the time between the selected RO and the selected PO may be random. For this reason, the base station may not be able to ensure at least a particular length of time is allocated for the time between the selected RO and the selected PO. For example, as described above with regard to the third condition, to reliably transmit the payload portion without a DMRS, the time elapsed between the transmission of the preamble portion and the transmission of the payload portion should be less than an elapsed time threshold. Hence, in an aspect where the configuration information indicates multiple ROs for the preamble portion and multiple POs for the payload portion, if an offset time between an RO selected from the multiple ROs and a PO selected from the multiple POs is shorter than an offset time threshold, the UE may transmit the payload portion including the PUSCH message without a DMRS. On the other hand, if the offset time between the RO selected from the multiple ROs and the PO selected from the multiple POs is greater than or equal to the offset time threshold, which may to cause the time elapsed between the transmission of the preamble portion and the transmission of the payload portion to be greater than or equal to the elapsed time threshold, the UE may transmit the payload portion including the PUSCH message and a DMRS.

Figure 13A:
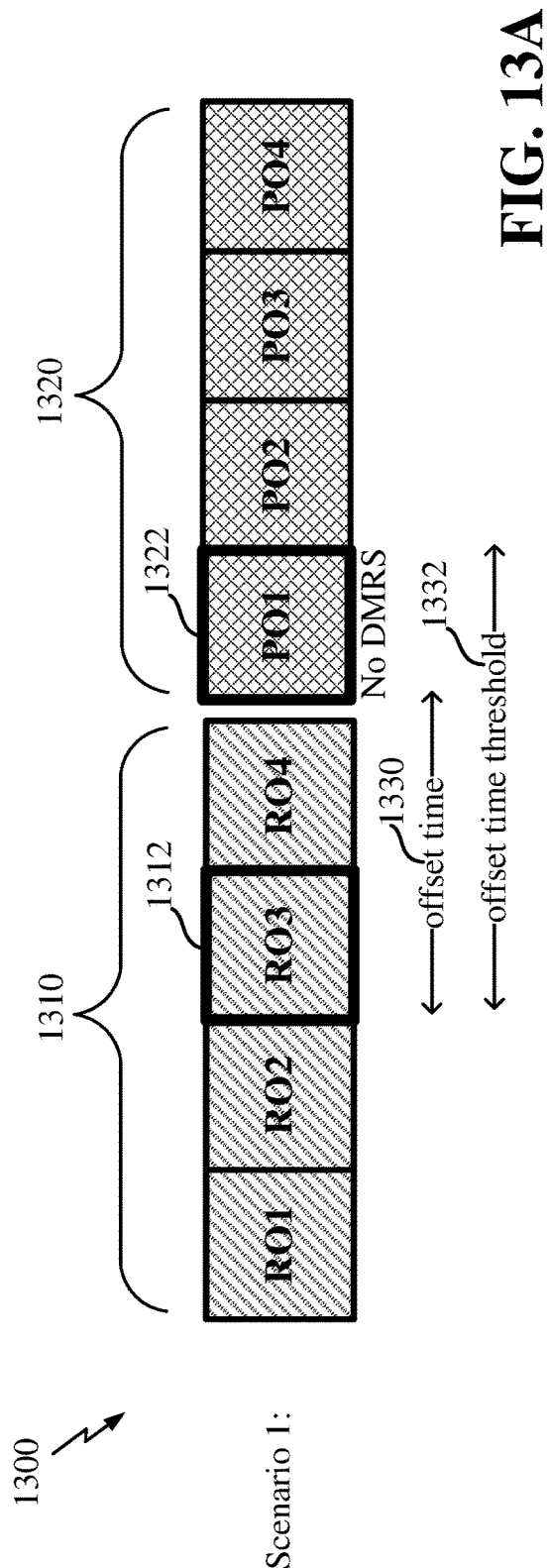
FIG. 13A is an example diagram illustrating a first scenario with an offset time between a selected RO and a selected PO being shorter than the offset time threshold, according to some aspects.

FIG. 13A is an example diagram 1300 illustrating a first scenario with an offset time between a selected RO and a selected PO being shorter than the offset time threshold, according to some aspects. In FIG. 13A, multiple ROs 1310 and multiple POs 1320 are respectively configured for transmissions of the preamble portion and the payload portion. The UE randomly selects an RO 1312 from the multiple ROs 1310 and randomly selects a PO 1322 from the multiple POs 1320. In FIG. 13A, an offset time 1330 between the selected RO 1312 and the selected PO 1322 is shorter than the offset time threshold 1332, and thus the UE may transmit the payload portion on the selected PO 1322 without a DMRS.

Figure 13B:
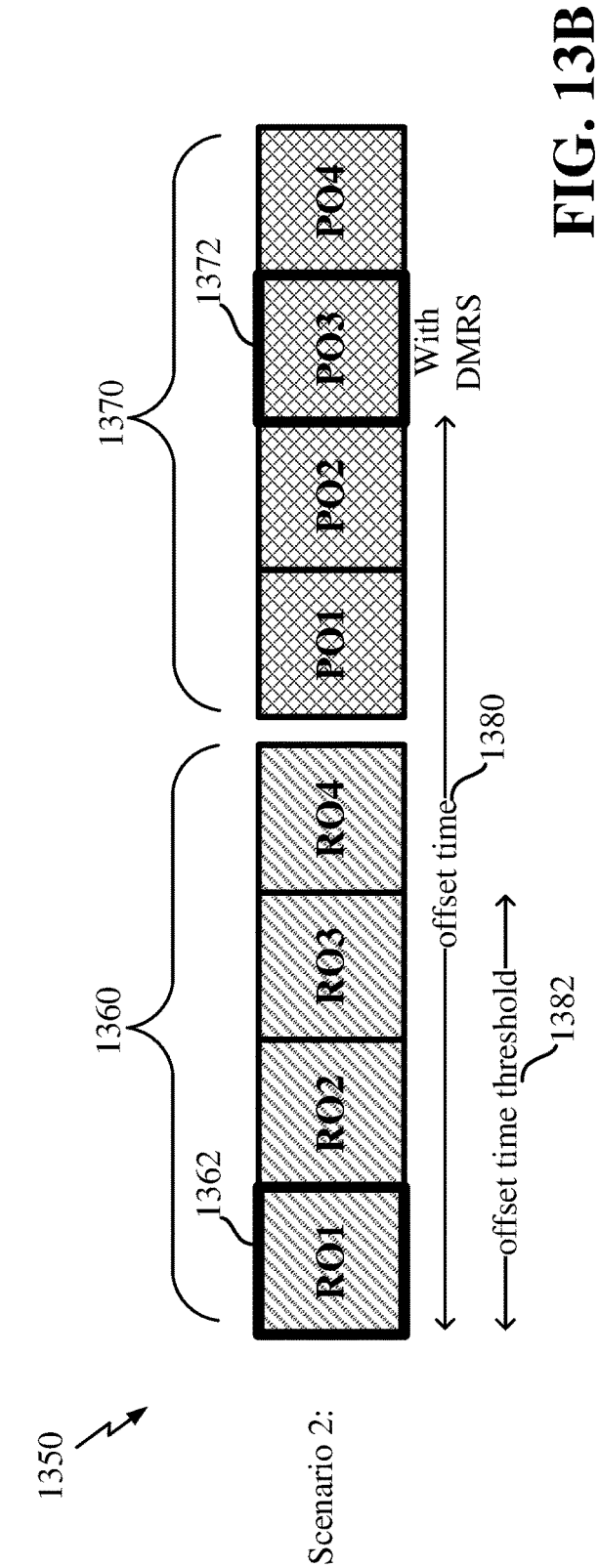
FIG. 13B is an example diagram illustrating a second scenario with an offset time between a selected RO and a selected PO being greater than or equal to the offset time threshold, according to some aspects.

FIG. 13B is an example diagram 1350 illustrating a second scenario with an offset time between a selected RO and a selected PO being greater than or equal to the offset time threshold, according to some aspects. In FIG. 13B, multiple ROs 1360 and multiple POs 1370 are respectively configured for transmissions of the preamble portion and the payload portion. The UE randomly selects an RO 1362 from the multiple ROs 1360 and randomly selects a PO 1372 from the multiple POs 1370. In FIG. 13B, an offset time 1380 between the selected RO 1362 and the selected PO 1372 is greater than the offset time threshold 1382, and thus the UE may transmit the payload portion on the selected PO 1372 with a DMRS.

In an aspect, the selected RO and the selected PO may be multiplexed in a time domain or a frequency domain. In an aspect, the configuration information may indicate a guard band and/or a time switching gap between two of the multiple ROs. In an aspect, the configuration information may indicate a guard band and/or a time switching gap between two of the multiple POs.

Because the PRACH message may be the first message transmitted from the UE to the base station, the base station may not know the UE capability of the RF bandwidth. For example, referring back to the first condition described above, the base station may not know if the UE supports utilizing a greater bandwidth of the two different bandwidths of two signals. For example, referring back to the second condition described above, the base station may not know if the UE supports the aggregate bandwidth of two signals, to be able to configure the UE radio RF configuration for a transmission of the preamble portion to be the same as the UE RF configuration for a transmission of the payload portion. The following approaches may be utilized to address this issue of the base station not knowing the UE capability of the RF bandwidth.

In an aspect, by configuring (e.g., by the base station) a bandwidth and a frequency range for the preamble portion to be the same as a bandwidth and a frequency range for the payload portion, the satisfaction of the one or more conditions may be achieved and thus a DMRS may be excluded from the payload portion.

In an aspect, the configuration information may include a first configuration and a second configuration different from the first configuration. The first configuration may include the configuration for the transmission of the preamble portion and the transmission of the payload portion without the DMRS, which may be used when the satisfaction of the one or more conditions is achieved. The second configuration may be for the transmission of the preamble portion and the transmission of the payload portion with a DMRS, which may be used when the satisfaction of the one or more conditions is not achieved. As discussed above, in an aspect, configuring the bandwidth and the frequency range for the preamble portion to be the same as the bandwidth and a frequency range for the payload portion may achieve the satisfaction of the one or more conditions. In an aspect, these two configurations may have orthogonal preambles (in time, frequency, and/or sequence), and/or orthogonal POs (in time and/or frequency). Hence, for example, at least one RO for the preamble portion of the first configuration may be orthogonal to at least one RO for the preamble portion of the second configuration, and at least one PO for the preamble portion of the first configuration may be orthogonal to at least one PO for the preamble portion of the second configuration.

Figure 14:
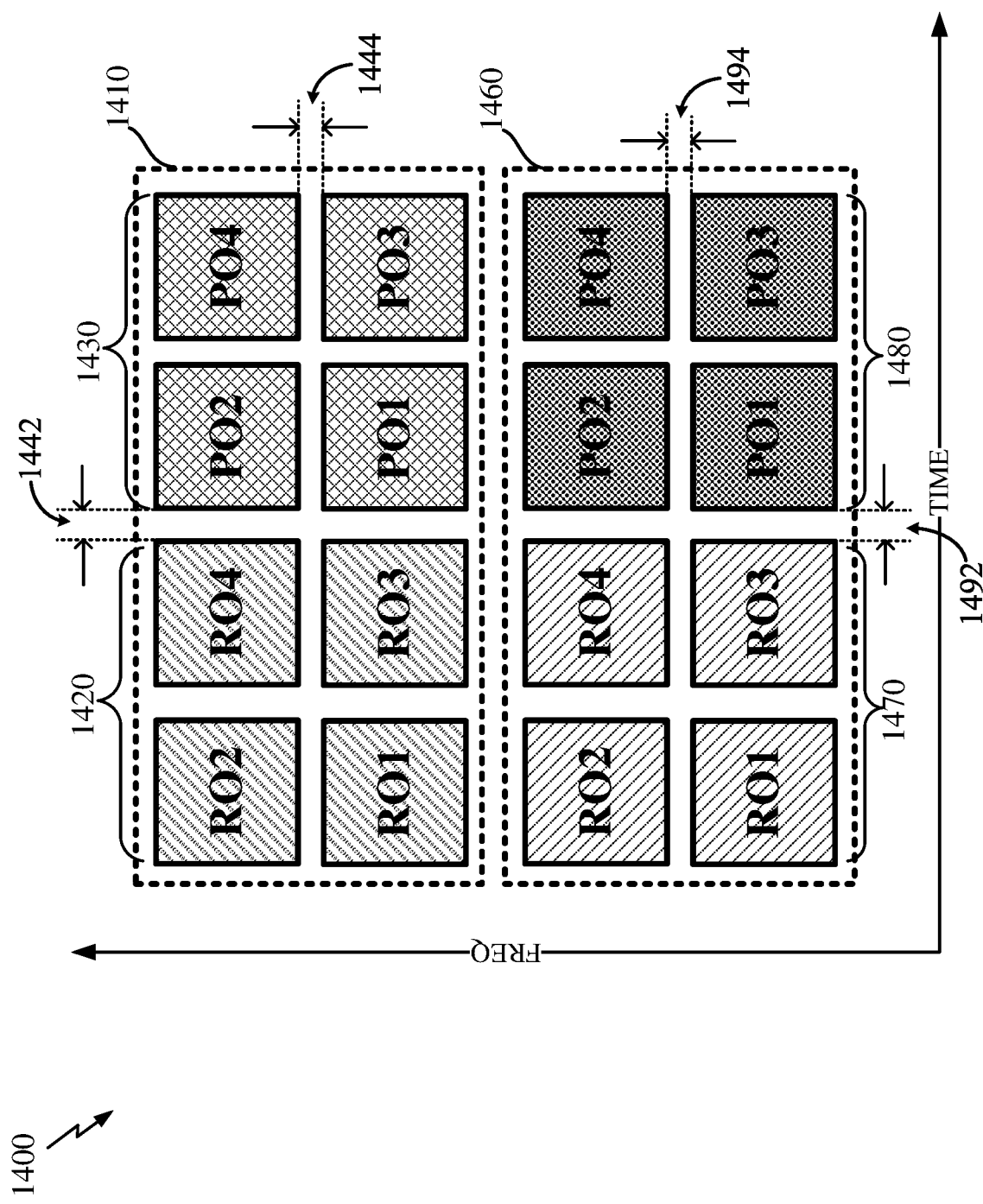
FIG. 14 is an example diagram of a first configuration and a second configuration for transmitting the preamble portion and the payload portion, according to some aspects.

FIG. 14 is an example diagram 1400 of a first configuration and a second configuration for transmitting the preamble portion and the payload portion, according to some aspects. In FIG. 14, a first configuration 1410 includes multiple ROs 1420 and multiple POs 1430, where the multiple ROs 1420 are separated in time from the multiple POs 1430 by a time gap 1442. A guard band 1444 may exist between two different rows of the multiple ROs 1420 and the multiple POs 1430. A second configuration 1460 includes multiple ROs 1470 and multiple POs 1480, where the multiple ROs 1470 are separated in time from the multiple POs 1480 by a time gap 1492. A guard band 1494 may exist between two different rows of the multiple ROs 1470 and the multiple POs 1480. The first configuration 1410 is for the transmission of the preamble portion and the transmission of the payload portion without the DMRS, which may be used when the satisfaction of the one or more conditions is achieved. The second configuration 1460 is for the transmission of the preamble portion and the transmission of the payload portion with a DMRS, which may be used when the satisfaction of the one or more conditions is not achieved. As shown in FIG. 14, the ROs 1420 the first configuration 1410 may be orthogonal to ROs 1470 of the second configuration 1460, and the POs 1430 the first configuration 1410 may be orthogonal to the POs 1480 of the second configuration 1460.

Figure 15:
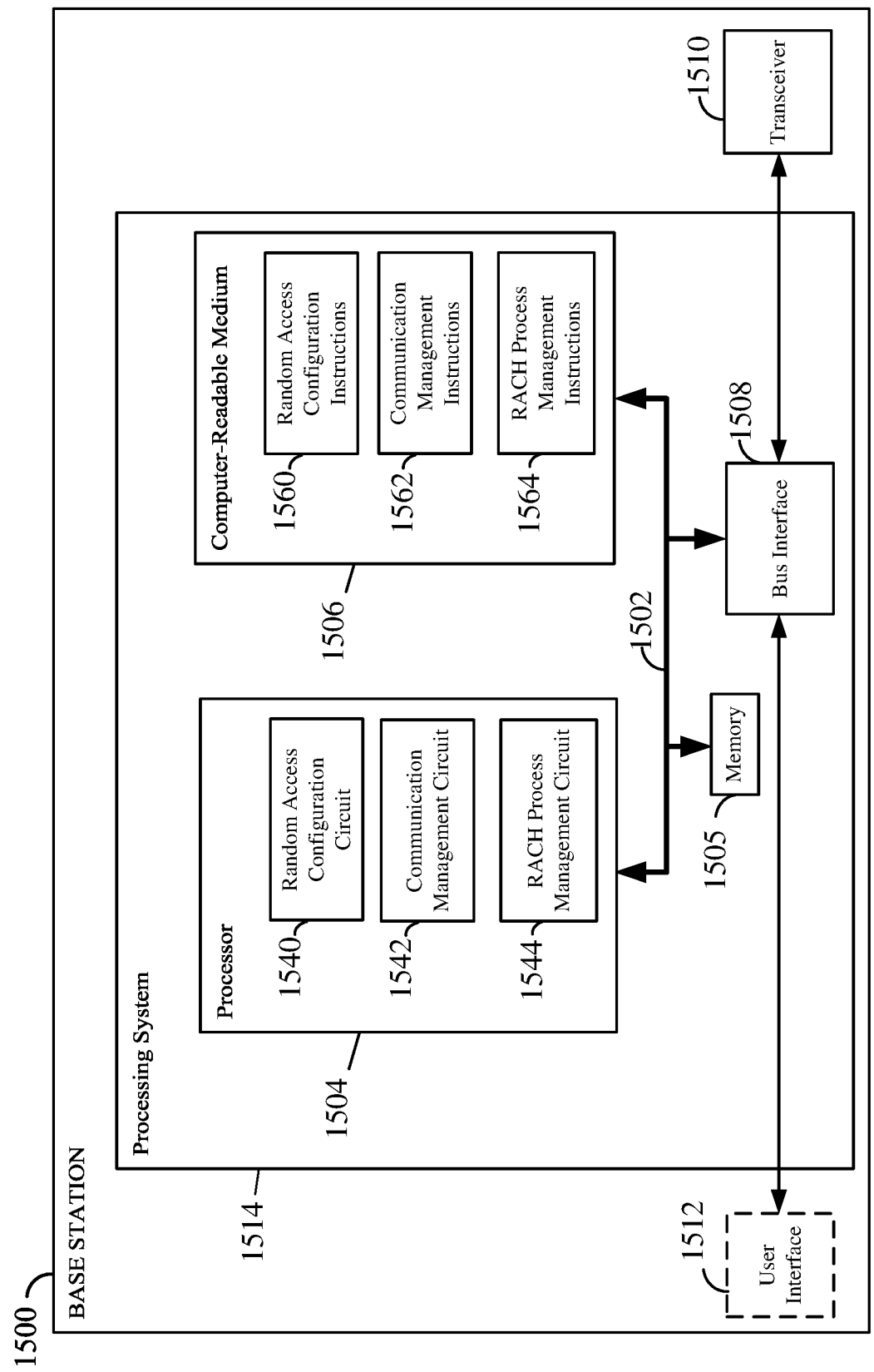
FIG. 15 is a block diagram conceptually illustrating an example of a hardware implementation for a base station, according to some aspects.

FIG. 15 is a block diagram illustrating an example of a hardware implementation for a base station 1500 employing a processing system 1514. For example, the base station 1500 may be a base station as illustrated in any one or more of FIGS. 1, 2, 3, 7, and/or 11.

The base station 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1500 may be configured to perform any one or more of the functions described herein. That is, the processor 1504, as utilized in a base station 1500, may be used to implement any one or more of the processes and procedures described below and illustrated in FIGS. 16-17.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable storage medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver

1510. The transceiver 1510 provides a communication interface or means for communicating with various other apparatus over a transmission medium. Depending upon the nature of the apparatus, a user interface 1512 (e.g., keypad, display, speaker, microphone, joystick) may also be provided. Of course, such a user interface 1512 is optional, and may be omitted in some examples, such as a base station.

In some aspects of the disclosure, the processor 1504 may include a random access configuration circuit 1540 configured for various functions, including, for example, determining a random access configuration to configure at least one UE with a two-step RACH process that comprises a communication of a first message that includes a preamble portion including a PRACH message and further includes a payload portion including a PUSCH message, wherein the determining the random access configuration comprises determining to exclude a DMRS from the payload portion based on satisfaction of one or more conditions. For example, the random access configuration circuit 1540 may be configured to implement one or more of the functions described below in relation to FIGS. 16-17, including, e.g., blocks 1602 and 1704.

In some aspects, the random access configuration circuit 1540 may be configured for various functions, including, for example, generating configuration information including the random access configuration indicating the two-step RACH process, the configuration information including a configuration for a transmission of the preamble portion and a transmission of the payload portion without the DMRS based on the satisfaction of one or more conditions. For example, the random access configuration circuit 1540 may be configured to implement one or more of the functions described below in relation to FIGS. 16-17, including, e.g., blocks 1604 and 1706.

In some aspects, the random access configuration circuit 1540 may be configured for various functions, including, for example, determining that a bandwidth and a frequency range for the preamble portion are the same as a bandwidth and a frequency range for the payload portion. For example, the random access configuration circuit 1540 may be configured to implement one or more of the functions described below in relation to FIG. 17, including, e.g., block 1702.

In some aspects, the random access configuration circuit 1540 may be configured for various functions, including, for example, determining, when the configuration information comprises the indication to exclude the guard time in the preamble portion occurring after the PRACH message, the length of the CP of the preamble portion and the length of the CP of the payload portion based on a length of the guard time, the length of the CP of the preamble portion and the length of the CP of the payload portion are included in the configuration information. For example, the random access configuration circuit 1540 may be configured to implement one or more of the functions described below in relation to FIG. 17, including, e.g., block 1708.

In some aspects of the disclosure, the processor 1504 may include a communication management circuit 1542 configured for various functions, including, for example, transmitting the configuration information to the at least one UE. For example, the communication management circuit 1542 may be configured to implement one or more of the functions described below in relation to FIGS. 16-17, including, e.g., blocks 1606 and 1710.

In some aspects of the disclosure, the processor 1504 may include a RACH process management circuit 1544 configured for various functions, including, for example, receiving, from the at least one UE and based on the configuration information, a first RACH message that includes the preamble portion and the payload portion without the DMRS, using the single carrier waveform. For example, the RACH process management circuit 1544 may be configured to implement one or more of the functions described below in relation to FIGS. 16-17, including, e.g., blocks 1608 and 1712.

The processor 1504 is responsible for managing the bus 1502 and general processing, including the execution of software stored on the computer-readable storage medium 1506. The software, when executed by the processor 1504, causes the processing system 1514 to perform the various functions described below for any particular apparatus. The computer-readable storage medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1506. The computer-readable storage medium 1506 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1506 may reside in the processing system 1514, external to the processing system 1514, or distributed across multiple entities including the processing system 1514. The computer-readable storage medium 1506 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the computer-readable storage medium 1506 may include a random access configuration software/instructions 1560 configured for various functions, including, for example, determining a random access configuration to configure at least one UE with a two-step RACH process that comprises a communication of a first message that includes a preamble portion including a PRACH message and further includes a payload portion including a PUSCH message, wherein the determining the random access configuration comprises determining to exclude a DMRS from the payload portion based on satisfaction of one or more conditions. For example, the random access configuration software/instructions 1560 may be configured to implement one or more of the functions described below in relation to FIGS. 16-17, including, e.g., blocks 1602 and 1704.

In some aspects, the random access configuration software/instructions 1560 may be configured for various functions, including, for example, generating configuration information including the random access configuration indicating the two-step RACH process, the configuration information including a configuration for a transmission of the preamble portion and a transmission of the payload portion without the DMRS based on the satisfaction of one or more conditions. For example, the random access configuration software/instructions 1560 may be configured to implement one or more of the functions described below in relation to FIGS. 16-17, including, e.g., blocks 1604 and 1706.

In some aspects, the random access configuration software/instructions 1560 may be configured for various functions, including, for example, determining that a bandwidth and a frequency range for the preamble portion are the same as a bandwidth and a frequency range for the payload portion. For example, the random access configuration software/instructions 1560 may be configured to implement one or more of the functions described below in relation to FIG. 17, including, e.g., block 1702.

In some aspects, the random access configuration software/instructions 1560 may be configured for various functions, including, for example, determining, when the configuration information comprises the indication to exclude the guard time in the preamble portion occurring after the PRACH message, the length of the CP of the preamble portion and the length of the CP of the payload portion based on a length of the guard time, the length of the CP of the preamble portion and the length of the CP of the payload portion are included in the configuration information. For example, the random access configuration software/instructions 1560 may be configured to implement one or more of the functions described below in relation to FIG. 17, including, e.g., block 1708.

In some aspects of the disclosure, the computer-readable storage medium 1506 may include a communication management software/instructions 1562 configured for various functions, including, for example, transmitting the configuration information to the at least one UE. For example, the communication management software/instructions 1562 may be configured to implement one or more of the functions described below in relation to FIGS. 16-17, including, e.g., blocks 1606 and 1710.

In some aspects of the disclosure, the computer-readable storage medium 1506 may include a RACH process management software/instructions 1564 configured for various functions, including, for example, receiving, from the at least one UE and based on the configuration information, a first RACH message that includes the preamble portion and the payload portion without the DMRS, using the single carrier waveform. For example, the RACH process management software/instructions 1564 may be configured to implement one or more of the functions described below in relation to FIGS. 16-17, including, e.g., blocks 1608 and 1712.

Figure 16:
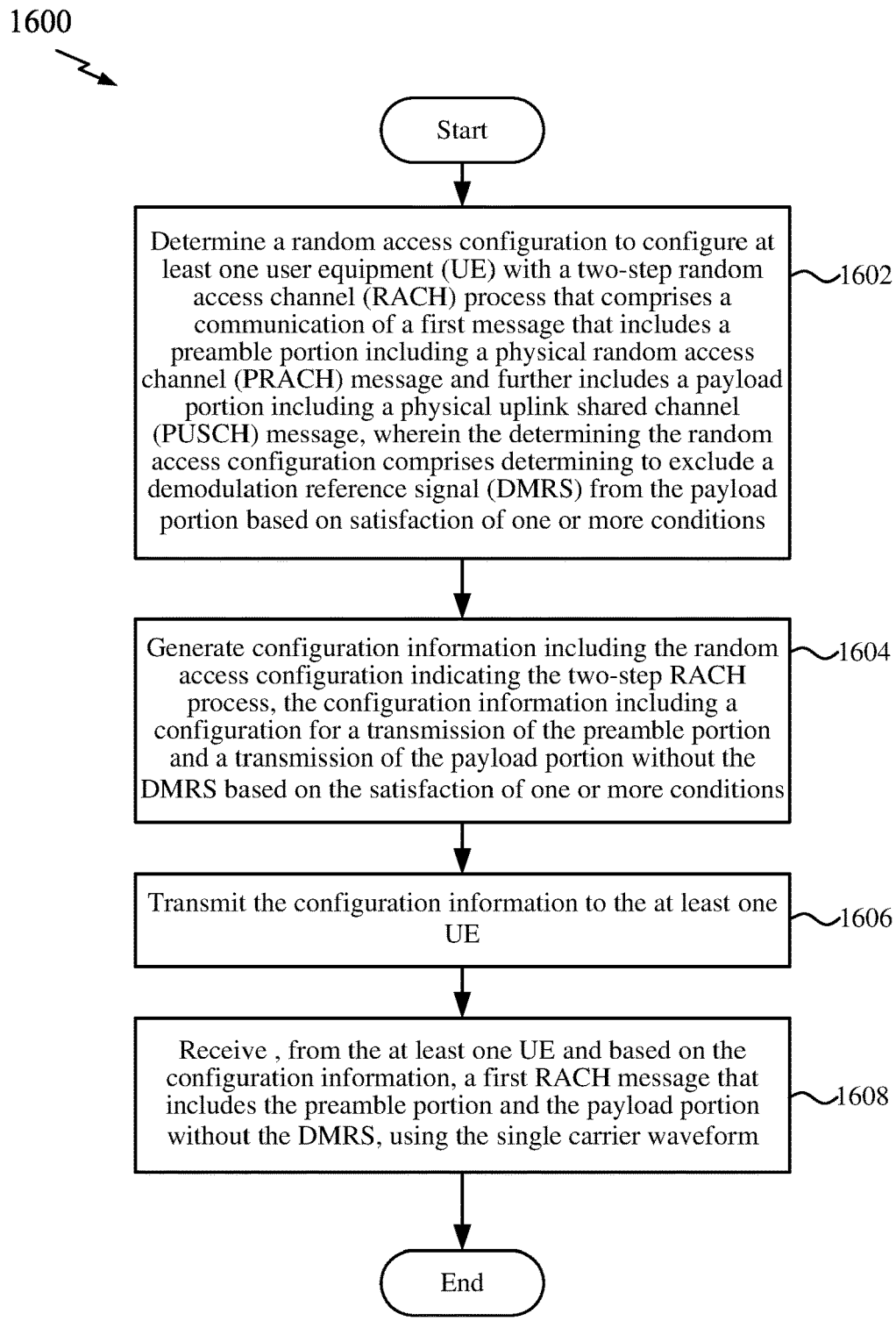
FIG. 16 is a flow chart illustrating an exemplary process for wireless communication utilizing a single carrier waveform, according to some aspects.

FIG. 16 is a flow chart illustrating an exemplary process 1600 for wireless communication utilizing a single carrier waveform in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the base station 1500 illustrated in FIG. 15. In some examples, the process 1600 may be carried out by any suitable apparatus or means for carrying out the functions or algorithm described below.

At block 1602, the base station 1500 may determine a random access configuration to configure at least one UE with a two-step RACH process that comprises a communication of a first message that includes a preamble portion including a PRACH message and further includes a payload portion including a PUSCH message, wherein the determining the random access configuration comprises determining to exclude a DMRS from the payload portion based on satisfaction of one or more conditions. For example, the random access configuration circuit 1540 shown and described above in connection with FIG. 15 may provide means for determining the random access configuration. In an aspect, the two-step RACH process may further include a communication of a second message including a random access response and a contention resolution message.

At block 1604, the base station 1500 may generate configuration information including the random access configuration indicating the two-step RACH process, the configuration information including a configuration for a transmission of the preamble portion and a transmission of the payload portion without the DMRS based on the satisfaction of one or more conditions. For example, the random access configuration circuit 1540 shown and described above in connection with FIG. 15 may provide means for generating configuration information.

At block 1606, the base station 1500 may transmit the configuration information to the at least one UE. For example, the communication management circuit 1542 shown and described above in connection with FIG. 15 may provide means for transmitting the configuration information.

At block 1608, the base station 1500 may receive, from the at least one UE and based on the configuration information, a first RACH message that includes the preamble portion and the payload portion without the DMRS, using the single carrier waveform. For example, the RACH process management circuit 1544 shown and described above in connection with FIG. 15 may provide means for receiving the first RACH message.

Figure 17:
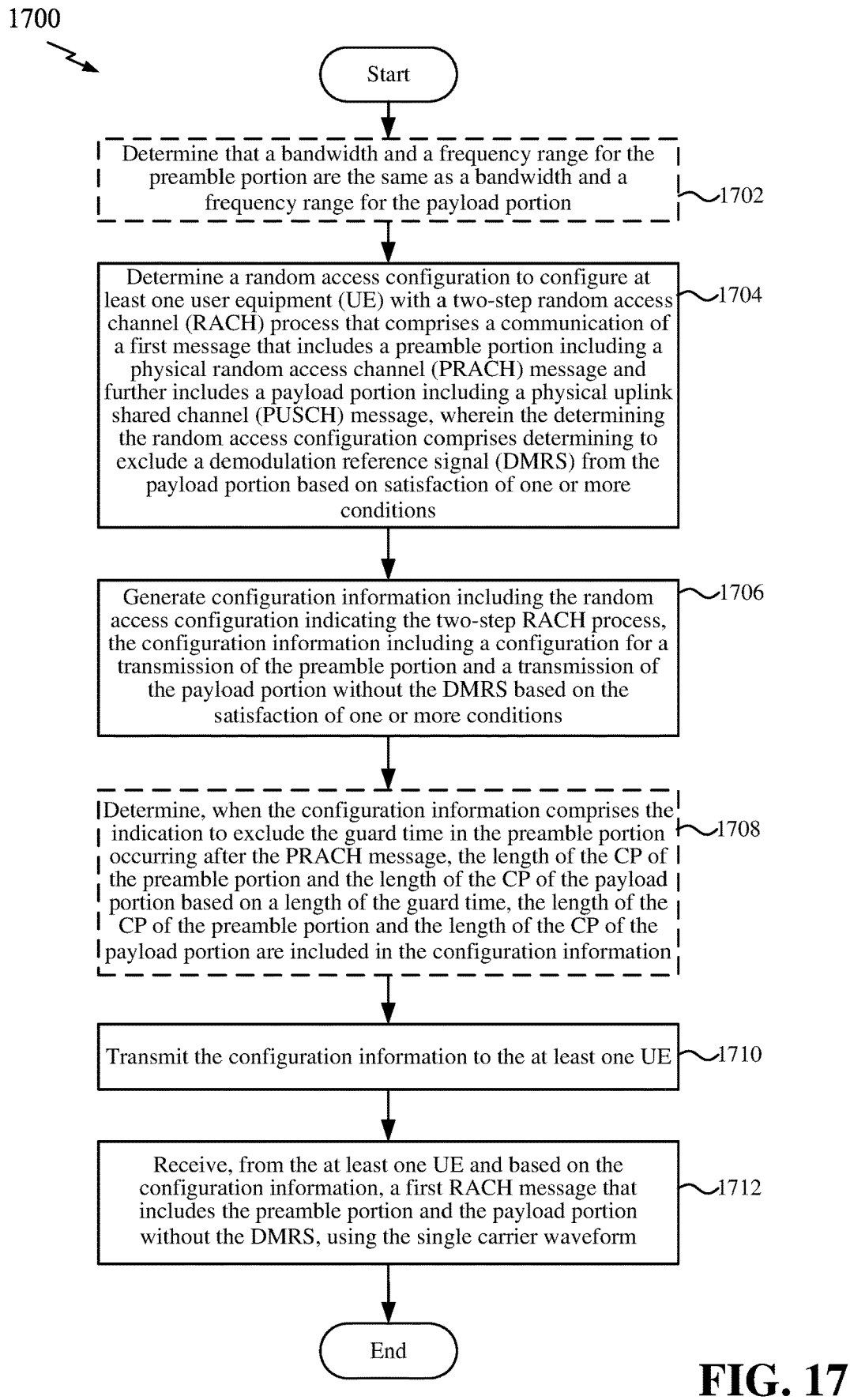
FIG. 17 is a flow chart illustrating an exemplary process for wireless communication utilizing a single carrier waveform, according to some aspects.

FIG. 17 is a flow chart illustrating an exemplary process 1700 for wireless communication utilizing a single carrier waveform in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the base station 1500 illustrated in FIG. 15. In some examples, the process 1700 may be carried out by any suitable apparatus or means for carrying out the functions or algorithm described below.

At block 1702, in an aspect, the base station 1500 may determine that a bandwidth and a frequency range for the preamble portion are the same as a bandwidth and a frequency range for the payload portion. For example, the random access configuration circuit 1540 shown and described above in connection with FIG. 15 may provide means for determining that the bandwidth and the frequency range for the preamble portion are the same as a bandwidth and the frequency range for the payload portion.

At block 1704, the base station 1500 may determine a random access configuration to configure at least one UE with a two-step RACH process that comprises a communication of a first message that includes a preamble portion including a PRACH message and further includes a payload portion including a PUSCH message, wherein the determining the random access configuration comprises determining to exclude a DMRS from the payload portion based on satisfaction of one or more conditions. For example, the random access configuration circuit 1540 shown and described above in connection with FIG. 15 may provide means for determining the random access configuration. In an aspect, the two-step RACH process may further include a communication of a second message including a random access response and a contention resolution message.

In an aspect, the satisfaction of the one or more conditions may be achieved by at least one of: configuring a bandwidth for the preamble portion to be greater than or equal to a bandwidth for the payload portion, configuring a UE RF configuration for a transmission of the preamble portion to be the same as a UE RF configuration for a transmission of the payload portion, configuring a time elapsed between the transmission of the preamble portion and the transmission of the payload portion to be less than an elapsed time threshold, configuring, if a DFT-s-OFDM waveform is used, a subcarrier spacing associated with resources for the transmission of the preamble portion to be the same as a subcarrier spacing associated with resources for the transmission of the payload portion, or configuring a transmission power for the transmission of the preamble portion to be the same as a transmission power for the transmission of the payload portion.

In an aspect, the configuration information nay indicate that RF switching is not to be performed between the transmission of the preamble portion and the transmission of the payload portion.

In an aspect, the satisfaction of the one or more conditions may be achieved by configuring a bandwidth and a frequency range for the preamble portion to be the same as a bandwidth and a frequency range for the payload portion. In this aspect, the configuration information may indicate: a first configuration including the configuration for the transmission of the preamble portion and the transmission of the payload portion without the DMRS when the satisfaction of the one or more conditions is achieved, and a second configuration for the transmission of the preamble portion and the transmission of the payload portion with a DMRS when the satisfaction of the one or more conditions is not achieved. In this aspect, at least one RACH occasion for the preamble portion of the first configuration may be orthogonal to at least one RACH occasion for the preamble portion of the second configuration, and at least one PUSCH occasion for the preamble portion of the first configuration may be orthogonal to at least one PUSCH occasion for the preamble portion of the second configuration.

At block 1706, the base station 1500 may generate configuration information including the random access configuration indicating the two-step RACH process, the configuration information including a configuration for a transmission of the preamble portion and a transmission of the payload portion without the DMRS based on the satisfaction of one or more conditions. For example, the random access configuration circuit 1540 shown and described above in connection with FIG. 15 may provide means for generating configuration information.

In an aspect, the generating the configuration information at block 1706 may include generating, based on the determining at block 1702 that the bandwidth and the frequency range are the same for the preamble portion and the payload portion, scheduling information to schedule the transmission of the payload portion to occur immediately after the transmission of the preamble portion.

In an aspect, when a length of a CP of the payload portion is configured to be greater than or equal to a length of a CP of the preamble portion, the configuration information may include an indication to exclude a guard time in the preamble portion occurring after the PRACH message. In an aspect, when the length of the CP of the payload portion is configured to be shorter than the length of the CP of the preamble portion, the configuration information may include an indication to include at least one of the guard time in the preamble portion occurring after the PRACH message or a time gap occurring between the preamble portion and the payload portion.

At block 1708, in an aspect, the base station 1500 may determine, when the configuration information comprises the indication to exclude the guard time in the preamble portion occurring after the PRACH message, the length of the CP of the preamble portion and the length of the CP of the payload portion based on a length of the guard time, the length of the CP of the preamble portion and the length of the CP of the payload portion are included in the configuration information. For example, the random access configuration circuit 1540 shown and described above in connection with FIG. 15 may provide means for determining the length of the CP of the preamble portion and the length of the CP of the payload portion based on the length of the guard time.

At block 1710, the base station 1500 may transmit the configuration information to the at least one UE. For example, the communication management circuit 1542 shown and described above in connection with FIG. 15 may provide means for transmitting the configuration information.

At block 1712, the base station 1500 may receive, from the at least one UE and based on the configuration information, a first RACH message that includes the preamble portion and the payload portion without the DMRS, using the single carrier waveform. For example, the RACH process management circuit 1544 shown and described above in connection with FIG. 15 may provide means for receiving the first RACH message.

In an aspect, the configuration information may indicate a plurality of RACH occasions for the preamble portion and a plurality of PUSCH occasions for the payload portion. In this aspect, the receiving the first RACH message at block 1712 may include: receiving the payload portion including the PUSCH message without the DMRS when an offset time between a RACH occasion selected from the plurality of RACH occasions for the preamble portion and a PUSCH occasion selected from the plurality of PUSCH occasions for the payload portion is shorter than an offset time threshold, and receiving the payload portion including the PUSCH message and the DMRS when the offset time between the RACH occasion selected for the preamble portion and the PUSCH occasion selected for the payload portion is greater than or equal to the offset time threshold to cause the time elapsed between the transmission of the preamble portion and the transmission of the payload portion to be greater than or equal to the elapsed time threshold.

In one configuration, the base station 1500 for wireless communication utilizing a single carrier waveform includes means for determining a random access configuration to configure at least one UE with a two-step RACH process that comprises a communication of a first message that includes a preamble portion including a PRACH message and further includes a payload portion including a PUSCH message, wherein the determining the random access configuration comprises determining to exclude a DMRS from the payload portion based on satisfaction of one or more conditions, means for generating configuration information including the random access configuration indicating the two-step RACH process, the configuration information including a configuration for a transmission of the preamble portion and a transmission of the payload portion without the DMRS based on the satisfaction of one or more conditions, means for transmitting the configuration information to the at least one UE, and means for receiving, from the at least one UE and based on the configuration information, a first RACH message that includes the preamble portion and the payload portion without the DMRS, using the single carrier waveform. The base station 1500 may further include means for determining that a bandwidth and a frequency range for the preamble portion are the same as a bandwidth and a frequency range for the payload portion, and may further include means for determining, when the configuration information comprises the indication to exclude the guard time in the preamble portion occurring after the PRACH message, the length of the CP of the preamble portion and the length of the CP of the payload portion based on a length of the guard time.

In an aspect, the selected RACH occasion and the selected PUSCH occasion may be multiplexed in a time domain or a frequency domain.

In an aspect, the configuration information may indicate at least one of a guard band or a time switching gap between two of the plurality of RACH occasions, and/or the configuration information may indicate at least one of a guard band or a time switching gap between two of the plurality of PUSCH occasions.

In one aspect, the aforementioned means may be the processor(s) 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable storage medium 1506, or any other suitable apparatus or means described in any one of the FIGS. 1, 2, and/or 3, and utilizing, for example, the processes and/or algorithms described herein in relation to FIGS. 16 and/or 17.

Figure 18:
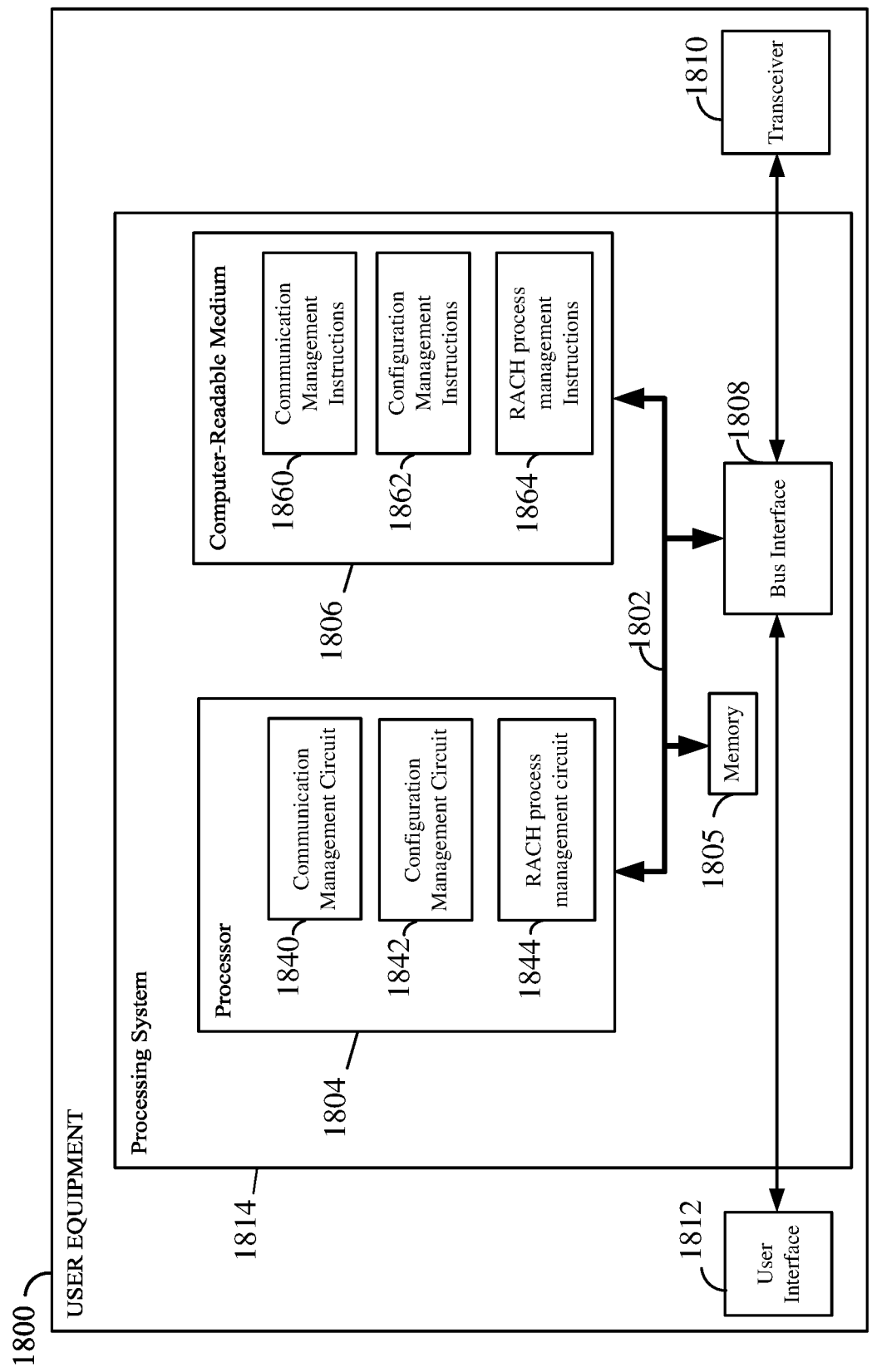
FIG. 18 is a block diagram conceptually illustrating an example of a hardware implementation for a user equipment, according to some aspects.

FIG. 18 is a conceptual diagram illustrating an example of a hardware implementation for an exemplary UE 1800 employing a processing system 1814. In accordance with various aspects of the disclosure, an element, or any portion of an element, or any combination of elements may be implemented with a processing system 1814 that includes one or more processors 1804. For example, the UE 1800 may be a UE as illustrated in any one or more of FIGS. 1, 2, 3, 7, and/or 11.

The processing system 1814 may be substantially the same as the processing system 1514 illustrated in FIG. 15, including a bus interface 1808, a bus 1802, memory 1805, a processor 1804, and a computer-readable storage medium 1806. Furthermore, the UE 1800 may include a user interface 1812 and a transceiver 1810 substantially similar to those described above in FIG. 15. That is, the processor 1804, as utilized in a UE 1800, may be used to implement any one or more of the processes described below and illustrated in FIGS. 19-20.

In some aspects of the disclosure, the processor 1804 may include a communication management circuit 1840 configured for various functions, including, for example, receiving, from a base station, configuration information including a random access configuration indicating a two-step RACH process, the two-step RACH process comprising a communication of a first message that includes a preamble portion including a PRACH message and further includes a payload portion including a PUSCH message, wherein the configuration information includes a configuration for a transmission of the preamble portion and a transmission of the payload portion without the DMRS based on satisfaction of one or more conditions. For example, the communication management circuit 1840 may be configured to implement one or more of the functions described below in relation to FIGS. 19-20, including, e.g., blocks 1902 and 2002.

In some aspects of the disclosure, the processor 1804 may include a configuration management circuit 1842 configured for various functions, including, for example, configuring the UE with the two-step RACH process based on the configuration information. For example, the configuration management circuit 1842 may be configured to implement one or more of the functions described below in relation to FIGS. 19-20, including, e.g., blocks 1904 and 2004.

In some aspects of the disclosure, the processor 1804 may include a RACH process management circuit 1844 configured for various functions, including, for example, transmitting, to the base station and based on the configuration information, a first RACH message that includes the preamble portion and the payload portion without the DMRS, using the single carrier waveform. For example, the RACH process management circuit 1844 may be configured to implement one or more of the functions described below in relation to FIGS. 19-20, including, e.g., blocks 1906 and 2006.

In some aspects, the RACH process management circuit 1844 may be configured for various functions, including, for example, receiving, from the base station, a second RACH message including the random access response and the contention resolution message. For example, the RACH process management circuit 1844 may be configured to implement one or more of the functions described below in relation to FIG. 20, including, e.g., block 2008.

In some aspects of the disclosure, the computer-readable storage medium 1506 may include communication management software/instructions 1860 configured for various functions, including, for example, receiving, from a base station, configuration information including a random access configuration indicating a two-step RACH process, the two-step RACH process comprising a communication of a first message that includes a preamble portion including a PRACH message and further includes a payload portion including a PUSCH message, wherein the configuration information includes a configuration for a transmission of the preamble portion and a transmission of the payload portion without the DMRS based on satisfaction of one or more conditions. For example, the communication management software/instructions 1860 may be configured to implement one or more of the functions described below in relation to FIGS. 19-20, including, e.g., blocks 1902 and 2002.

In some aspects of the disclosure, the computer-readable storage medium 1506 may include configuration management software/instructions 1862 configured for various functions, including, for example, configuring the UE with the two-step RACH process based on the configuration information. For example, the configuration management software/instructions 1862 may be configured to implement one or more of the functions described below in relation to FIGS. 19-20, including, e.g., blocks 1904 and 2004.

In some aspects of the disclosure, the computer-readable storage medium 1506 may include RACH process management software/instructions 1864 configured for various functions, including, for example, transmitting, to the base station and based on the configuration information, a first RACH message that includes the preamble portion and the payload portion without the DMRS, using the single carrier waveform. For example, the RACH process management software/instructions 1864 may be configured to implement one or more of the functions described below in relation to FIGS. 19-20, including, e.g., blocks 1906 and 2006.

In some aspects, the RACH process management software/instructions 1864 may be configured for various functions, including, for example, receiving, from the base station, a second RACH message including the random access response and the contention resolution message. For example, the RACH process management software/instructions 1864 may be configured to implement one or more of the functions described below in relation to FIG. 20, including, e.g., block 2008.

Figure 19:
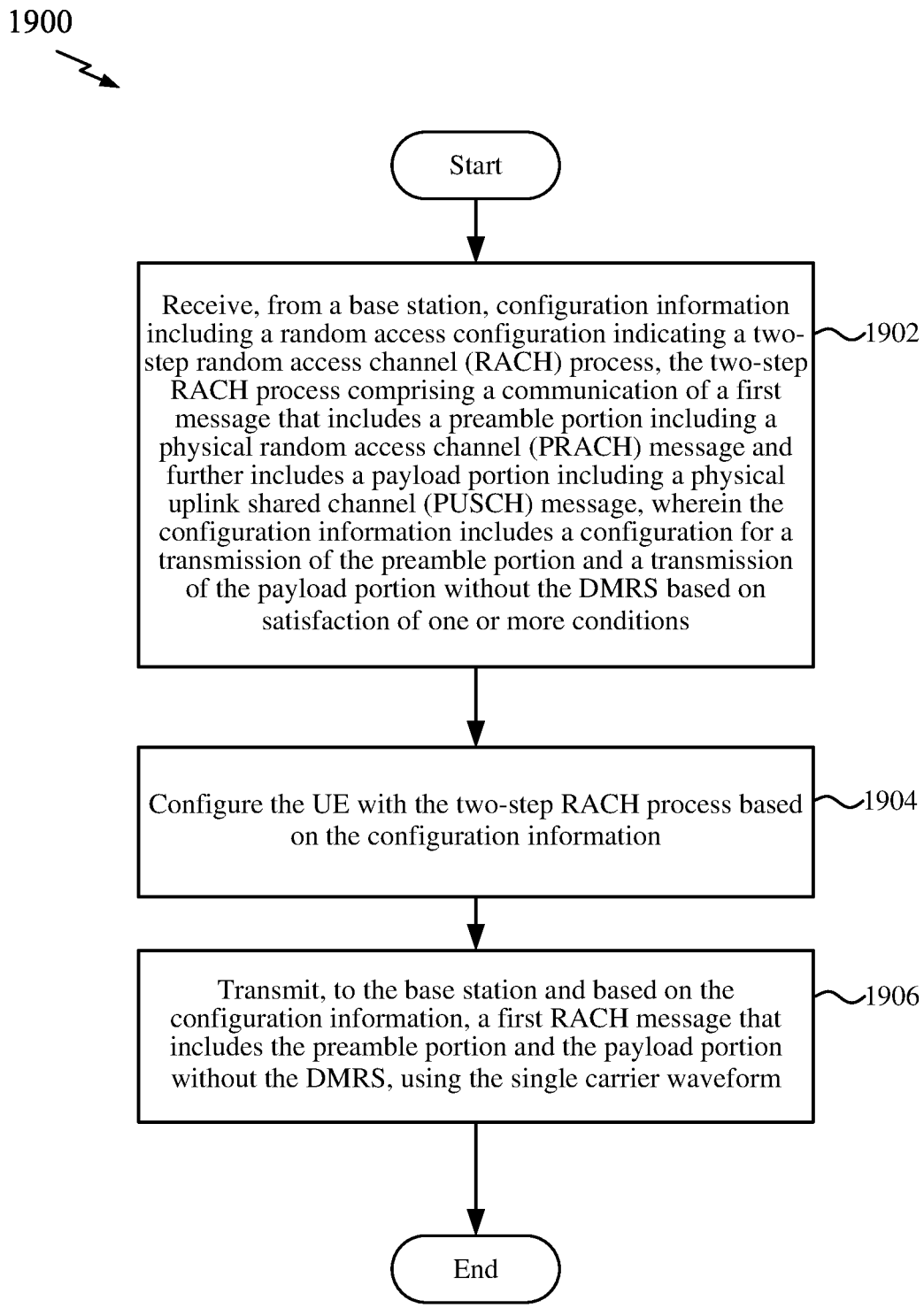
FIG. 19 is a flow chart illustrating an exemplary process for wireless communication utilizing a single carrier waveform, according to some aspects.

FIG. 19 is a flow chart illustrating an exemplary process 1900 for wireless communication utilizing a single carrier waveform in accordance with some aspects of the present disclosure. As described below, some or all illustrated features may be omitted in a particular implementation within the scope of the present disclosure, and some illustrated features may not be required for implementation of all embodiments. In some examples, the process 1900 may be carried out by the UE 1800 illustrated in FIG. 18. In some examples, the process 1900 may be carried out by any suitable apparatus or means for carrying out the functions or algorithm described below.

At block 1902, the UE 1800 may receive, from a base station, configuration information including a random access configuration indicating a two-step RACH process, the two-step RACH process comprising a communication of a first message that includes a preamble portion including a PRACH message and further includes a payload portion including a PUSCH message, wherein the configuration information includes a configuration for a transmission of the preamble portion and a transmission of the payload portion without the DMRS based on satisfaction of one or more conditions. For example, the communication management circuit 1840 shown and described above in connection with FIG. 18 may provide means for receiving the configuration information.

At block 1904, the UE 1800 may configure the UE 1800 with the two-step RACH process based on the configuration information. For example, the configuration management circuit 1842 shown and described above in connection with FIG. 18 may provide means for configuring the UE 1800.

At block 1906, the UE 1800 may transmit, to the base station and based on the configuration information, a first RACH message that includes the preamble portion and the payload portion without the DMRS, using the single carrier waveform. For example, the RACH process management circuit 1844 shown and described above in connection with FIG. 18 may provide means for transmitting the first RACH message.

FIG. 20 is a flow chart illustrating an exemplary process 2000 for wireless communication utilizing a single carrier waveform in accordance with some aspects of the present disclosure. As described below, some or all illustrated features may be omitted in a particular implementation within the scope of the present disclosure, and some illustrated features may not be required for implementation of all embodiments. In some examples, the process 2000 may be carried out by the UE 1800 illustrated in FIG. 18. In some examples, the process 2000 may be carried out by any suitable apparatus or means for carrying out the functions or algorithm described below.

At block 2002, the UE 1800 may receive, from a base station, configuration information including a random access configuration indicating a two-step RACH process, the two-step RACH process comprising a communication of a first message that includes a preamble portion including a PRACH message and further includes a payload portion including a PUSCH message, wherein the configuration information includes a configuration for a transmission of the preamble portion and a transmission of the payload portion without the DMRS based on satisfaction of one or more conditions. For example, the communication management circuit 1840 shown and described above in connection with FIG. 18 may provide means for receiving the configuration information.

In an aspect, the satisfaction of the one or more conditions may be achieved by at least one of: configuring a bandwidth for the preamble portion to be greater than or equal to a bandwidth for the payload portion, configuring a UE RF configuration for a transmission of the preamble portion to be the same as a UE RF configuration for a transmission of the payload portion, configuring a time elapsed between the transmission of the preamble portion and the transmission of the payload portion to be less than an elapsed time threshold, configuring, if a discrete Fourier transform spread orthogonal frequency-division multiplexing (DFT-s-OFDM) waveform is used, a subcarrier spacing associated with resources for the transmission of the preamble portion to be the same as a subcarrier spacing associated with resources for the transmission of the payload portion, or configuring a transmission power for the transmission of the preamble portion to be the same as a transmission power for the transmission of the payload portion.

In an aspect, the configuration information may indicate that RF switching is not to be performed between the transmission of the preamble portion and the transmission of the payload portion.

In an aspect, the bandwidth and the frequency range may be the same for the preamble portion and the payload portion, and the configuration information may include scheduling information to schedule the transmission of the payload portion to occur immediately after the transmission of the preamble portion, based on the bandwidth and the frequency range being the same for the preamble portion and the payload portion. In an aspect, when a length of a cyclic prefix (CP) of the payload portion is configured to be greater than or equal to a length of a CP of the preamble portion, the configuration information may include an indication to exclude a guard time in the preamble portion occurring after the PRACH message. In an aspect, when the length of the CP of the payload portion is configured to be shorter than the length of the CP of the preamble portion, the configuration information may include an indication to include at least one of the guard time in the preamble portion occurring after the PRACH message or a time gap occurring between the preamble portion and the payload portion. In an aspect, when the configuration information comprises the indication to exclude the guard time in the preamble portion occurring after the PRACH message, the length of the CP of the preamble portion and the length of the CP of the payload portion may be based on a length of the guard time, and the length of the CP of the preamble portion and the length of the CP of the payload portion may be included in the configuration information.

In an aspect, the satisfaction of the one or more conditions may be achieved by configuring a bandwidth and a frequency range for the preamble portion to be the same as a bandwidth and a frequency range for the payload portion. In an aspect, the configuration information may indicate: a first configuration including the configuration for the transmission of the preamble portion and the transmission of the payload portion without the DMRS when the satisfaction of the one or more conditions is achieved, and a second configuration for the transmission of the preamble portion and the transmission of the payload portion with a DMRS when the satisfaction of the one or more conditions is not achieved. In an aspect, at least one RACH occasion for the preamble portion of the first configuration may be orthogonal to at least one RACH occasion for the preamble portion of the second configuration, and at least one PUSCH occasion for the preamble portion of the first configuration may be orthogonal to at least one PUSCH occasion for the preamble portion of the second configuration.

At block 2004, the UE 1800 may configure the UE 1800 with the two-step RACH process based on the configuration information. For example, the configuration management circuit 1842 shown and described above in connection with FIG. 18 may provide means for configuring the UE 1800.

At block 2006, the UE 1800 may transmit, to the base station and based on the configuration information, a first RACH message that includes the preamble portion and the payload portion without the DMRS, using the single carrier waveform. For example, the RACH process management circuit 1844 shown and described above in connection with FIG. 18 may provide means for transmitting the first RACH message.

In an aspect, the configuration information may indicate a plurality of RACH occasions for the preamble portion and a plurality of PUSCH occasions for the payload portion. In this aspect, the transmitting the first RACH message at block 2006 may include: transmitting the payload portion including the PUSCH message without the DMRS when an offset time between a RACH occasion selected from the plurality of RACH occasions for the preamble portion and a PUSCH occasion selected from the plurality of PUSCH occasions for the payload portion is shorter than an offset time threshold, and transmitting the payload portion including the PUSCH message and the DMRS when the offset time between the RACH occasion selected for the preamble portion and the PUSCH occasion selected for the payload portion is greater than or equal to the offset time threshold to cause the time elapsed between the transmission of the preamble portion and the transmission of the payload portion to be greater than or equal to the elapsed time threshold.

In an aspect, the selected RACH occasion and the selected PUSCH occasion may be multiplexed in a time domain or a frequency domain.

In an aspect, the configuration information may indicate at least one of a guard band or a time switching gap between two of the plurality of RACH occasions, and/or the configuration information indicates at least one of a guard band or a time switching gap between two of the plurality of PUSCH occasions.

At block 2008, in an aspect, the two-step RACH process may further include a communication of a second message including a random access response and a contention resolution message, and the UE 1800 may receive, from the base station and based on the configuration information, a second RACH message including the random access response and the contention resolution message. For example, the RACH process management circuit 1844 shown and described above in connection with FIG. 18 may provide means for transmitting the second RACH message.

In one configuration, the UE 1800 for wireless communication utilizing a single carrier waveform includes means for means for receiving, from a base station, configuration information including a random access configuration indicating a two-step RACH process, the two-step RACH process comprising a communication of a first message that includes a preamble portion including a PRACH message and further includes a payload portion including a PUSCH message, wherein the configuration information includes a configuration for a transmission of the preamble portion and a transmission of the payload portion without the DMRS based on satisfaction of one or more conditions, means for configuring the UE with the two-step RACH process based on the configuration information, and means for transmitting, to the base station and based on the configuration information, a first RACH message that includes the preamble portion and the payload portion without the DMRS, using the single carrier waveform. In an aspect, the UE 1800 may further include means for transmitting, to the base station, a second RACH message including the random access response and the contention resolution message. In one aspect, the aforementioned means may be the processor(s) 1804 shown in FIG. 18 configured to perform the functions recited by the aforementioned means. In another aspect, the aforementioned means may be a circuit or any apparatus configured to perform the functions recited by the aforementioned means.

Of course, in the above examples, the circuitry included in the processor 1804 is merely provided as an example, and other means for carrying out the described functions may be included within various aspects of the present disclosure, including but not limited to the instructions stored in the computer-readable storage medium 1806, or any other suitable apparatus or means described in any one of the FIGS. 1, 2, 3, 7, and/or 11, and utilizing, for example, the processes and/or algorithms described herein in relation to FIGS. 19 and/or 20.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-20 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-20 may be configured to perform one or more of the methods, features, or steps described herein. The novel algorithms described herein may also be efficiently implemented in software and/or embedded in hardware.

The following provides an overview of several aspects of the present disclosure.

Aspect 1: A method of wireless communication by a base station utilizing a single carrier waveform, comprising: determining a random access configuration to configure at least one user equipment (UE) with a two-step random access channel (RACH) process that comprises a communication of a first message that includes a preamble portion including a physical random access channel (PRACH) message and further includes a payload portion including a physical uplink shared channel (PUSCH) message, wherein the determining the random access configuration comprises determining to exclude a demodulation reference signal (DMRS) from the payload portion based on satisfaction of one or more conditions; generating configuration information including the random access configuration indicating the two-step RACH process, the configuration information including a configuration for a transmission of the preamble portion and a transmission of the payload portion without the DMRS based on the satisfaction of one or more conditions; transmitting the configuration information to the at least one UE; and receiving, from the at least one UE and based on the configuration information, a first RACH message that includes the preamble portion and the payload portion without the DMRS, using the single carrier waveform.

Aspect 2: The method of aspect 1, wherein the satisfaction of the one or more conditions is achieved by at least one of: configuring a bandwidth for the preamble portion to be greater than or equal to a bandwidth for the payload portion; configuring a UE radio frequency (RF) configuration for a transmission of the preamble portion to be the same as a UE RF configuration for a transmission of the payload portion; configuring a time elapsed between the transmission of the preamble portion and the transmission of the payload portion to be less than an elapsed time threshold; configuring, if a discrete Fourier transform spread orthogonal frequency-division multiplexing (DFT-s-OFDM) waveform is used, a subcarrier spacing associated with resources for the transmission of the preamble portion to be the same as a subcarrier spacing associated with resources for the transmission of the payload portion; or configuring a transmission power for the transmission of the preamble portion to be the same as a transmission power for the transmission of the payload portion.

Aspect 3: The method of aspect 1 or 2, wherein the configuration information indicates that RF switching is not to be performed between the transmission of the preamble portion and the transmission of the payload portion.

Aspect 4: The method of any of aspects 1 through 3, further comprising: determining that a bandwidth and a frequency range for the preamble portion are the same as a bandwidth and a frequency range for the payload portion; wherein the generating the configuration information comprises generating, based on the determining that the bandwidth and the frequency range are the same for the preamble portion and the payload portion, scheduling information to schedule the transmission of the payload portion to occur immediately after the transmission of the preamble portion.

Aspect 5: The method of aspect 4, wherein: when a length of a cyclic prefix (CP) of the payload portion is configured to be greater than or equal to a length of a CP of the preamble portion, the configuration information comprises an indication to exclude a guard time in the preamble portion occurring after the PRACH message; and when the length of the CP of the payload portion is configured to be shorter than the length of the CP of the preamble portion, the configuration information comprises an indication to include at least one of the guard time in the preamble portion occurring after the PRACH message or a time gap occurring between the preamble portion and the payload portion.

Aspect 6: The method of aspect 5, further comprising determining, when the configuration information comprises the indication to exclude the guard time in the preamble portion occurring after the PRACH message, the length of the CP of the preamble portion and the length of the CP of the payload portion based on a length of the guard time, wherein the length of the CP of the preamble portion and the length of the CP of the payload portion are included in the configuration information.

Aspect 7: The method of any of aspects 2 through 6, wherein the configuration information indicates a plurality of RACH occasions for the preamble portion and a plurality of PUSCH occasions for the payload portion, and wherein the receiving the first RACH message comprises: receiving the payload portion including the PUSCH message without the DMRS when an offset time between a RACH occasion selected from the plurality of RACH occasions for the preamble portion and a PUSCH occasion selected from the plurality of PUSCH occasions for the payload portion is shorter than an offset time threshold; and receiving the payload portion including the PUSCH message and the DMRS when the offset time between the RACH occasion selected for the preamble portion and the PUSCH occasion selected for the payload portion is greater than or equal to the offset time threshold to cause the time elapsed between the transmission of the preamble portion and the transmission of the payload portion to be greater than or equal to the elapsed time threshold.

Aspect 8: The method of aspect 7, wherein the selected RACH occasion and the selected PUSCH occasion are multiplexed in a time domain or a frequency domain.

Aspect 9: The method of aspect 7 or 8: wherein the configuration information indicates at least one of a guard band or a time switching gap between two of the plurality of RACH occasions, and/or wherein the configuration information indicates at least one of a guard band or a time switching gap between two of the plurality of PUSCH occasions.

Aspect 10: The method of any of aspects 1 through 9, wherein the satisfaction of the one or more conditions is achieved by configuring a bandwidth and a frequency range for the preamble portion to be the same as a bandwidth and a frequency range for the payload portion.

Aspect 11: The method of aspect 10, wherein the configuration information indicates: a first configuration including the configuration for the transmission of the preamble portion and the transmission of the payload portion without the DMRS when the satisfaction of the one or more conditions is achieved; and a second configuration for the transmission of the preamble portion and the transmission of the payload portion with a DMRS when the satisfaction of the one or more conditions is not achieved.

Aspect 12: The method of aspect 11, wherein at least one RACH occasion for the preamble portion of the first configuration is orthogonal to at least one RACH occasion for the preamble portion of the second configuration, and wherein at least one PUSCH occasion for the preamble portion of the first configuration is orthogonal to at least one PUSCH occasion for the preamble portion of the second configuration.

Aspect 13: The method of any of aspects 1 through 12, wherein the two-step RACH process further comprises a communication of a second message including a random access response and a contention resolution message.

Aspect 14: A base station comprising: a transceiver configured to communicate with a radio access network, a memory, and a processor communicatively coupled to the transceiver and the memory, wherein the processor and the memory are configured to perform any one of aspects 1 through 13.

Aspect 15: A base station configured for wireless communication comprising at least one means for performing any one of aspects 1 through 13.

Aspect 16: A non-transitory computer-readable storage medium having instructions for a base station thereon, wherein the instructions, when executed by a processing circuit, cause the processing circuit to perform any one of aspects 1 through 13.

Aspect 17: A method of wireless communication by a user equipment (UE) utilizing a single carrier waveform, comprising: receiving, from a base station, configuration information including a random access configuration indicating a two-step random access channel (RACH) process, the two-step RACH process comprising a communication of a first message that includes a preamble portion including a physical random access channel (PRACH) message and further includes a payload portion including a physical uplink shared channel (PUSCH) message, wherein the configuration information includes a configuration for a transmission of the preamble portion and a transmission of the payload portion without the DMRS based on satisfaction of one or more conditions; configuring the UE with the two-step RACH process based on the configuration information; and transmitting, to the base station and based on the configuration information, a first RACH message that includes the preamble portion and the payload portion without the DMRS, using the single carrier waveform.

Aspect 18: The method of aspect 17, wherein the satisfaction of the one or more conditions is achieved by at least one of: configuring a bandwidth for the preamble portion to be greater than or equal to a bandwidth for the payload portion; configuring a UE radio frequency (RF) configuration for a transmission of the preamble portion to be the same as a UE RF configuration for a transmission of the payload portion; configuring a time elapsed between the transmission of the preamble portion and the transmission of the payload portion to be less than an elapsed time threshold; configuring, if a discrete Fourier transform spread orthogonal frequency-division multiplexing (DFT-s-OFDM) waveform is used, a subcarrier spacing associated with resources for the transmission of the preamble portion to be the same as a subcarrier spacing associated with resources for the transmission of the payload portion; or configuring a transmission power for the transmission of the preamble portion to be the same as a transmission power for the transmission of the payload portion.

Aspect 19: The method of aspect 17 or 18, wherein the configuration information indicates that RF switching is not to be performed between the transmission of the preamble portion and the transmission of the payload portion.

Aspect 20: The method of any of aspects 17 through 19: wherein the bandwidth and the frequency range are the same for the preamble portion and the payload portion; and wherein the configuration information includes scheduling information to schedule the transmission of the payload portion to occur immediately after the transmission of the preamble portion, based on the bandwidth and the frequency range being the same for the preamble portion and the payload portion.

Aspect 21: The method of aspect 20, wherein: when a length of a cyclic prefix (CP) of the payload portion is configured to be greater than or equal to a length of a CP of the preamble portion, the configuration information comprises an indication to exclude a guard time in the preamble portion occurring after the PRACH message; and when the length of the CP of the payload portion is configured to be shorter than the length of the CP of the preamble portion, the configuration information comprises an indication to include at least one of the guard time in the preamble portion occurring after the PRACH message or a time gap occurring between the preamble portion and the payload portion.

Aspect 22: The method of aspect 21, wherein when the configuration information comprises the indication to exclude the guard time in the preamble portion occurring after the PRACH message, the length of the CP of the preamble portion and the length of the CP of the payload portion is based on a length of the guard time, and wherein the length of the CP of the preamble portion and the length of the CP of the payload portion are included in the configuration information.

Aspect 23: The method of any of aspects 18 through 22, wherein the configuration information indicates a plurality of RACH occasions for the preamble portion and a plurality of PUSCH occasions for the payload portion, and wherein the transmitting the first RACH message comprises: transmitting the payload portion including the PUSCH message without the DMRS when an offset time between a RACH occasion selected from the plurality of RACH occasions for the preamble portion and a PUSCH occasion selected from the plurality of PUSCH occasions for the payload portion is shorter than an offset time threshold; and transmitting the payload portion including the PUSCH message and the DMRS when the offset time between the RACH occasion selected for the preamble portion and the PUSCH occasion selected for the payload portion is greater than or equal to the offset time threshold to cause the time elapsed between the transmission of the preamble portion and the transmission of the payload portion to be greater than or equal to the elapsed time threshold.

Aspect 24: The method of aspect 23, wherein the selected RACH occasion and the selected PUSCH occasion are multiplexed in a time domain or a frequency domain.

Aspect 25: The method of aspect 23 or 24: wherein the configuration information indicates at least one of a guard band or a time switching gap between two of the plurality of RACH occasions, and/or wherein the configuration information indicates at least one of a guard band or a time switching gap between two of the plurality of PUSCH occasions.

Aspect 26: The method of any of aspects 17 through 25, wherein the satisfaction of the one or more conditions is achieved by configuring a bandwidth and a frequency range for the preamble portion to be the same as a bandwidth and a frequency range for the payload portion.

Aspect 27: The method of aspect 26, wherein the configuration information indicates: a first configuration including the configuration for the transmission of the preamble portion and the transmission of the payload portion without the DMRS when the satisfaction of the one or more conditions is achieved; and a second configuration for the transmission of the preamble portion and the transmission of the payload portion with a DMRS when the satisfaction of the one or more conditions is not achieved.

Aspect 28: The method of aspect 27, wherein at least one RACH occasion for the preamble portion of the first configuration is orthogonal to at least one RACH occasion for the preamble portion of the second configuration, and wherein at least one PUSCH occasion for the preamble portion of the first configuration is orthogonal to at least one PUSCH occasion for the preamble portion of the second configuration.

Aspect 29: The method of any of aspects 17 through 28, wherein the two-step RACH process further comprises a communication of a second message including a random access response and a contention resolution message, and wherein the method further comprises receiving, from the base station, a second RACH message including the random access response and the contention resolution message.

Aspect 30: A user equipment (UE) comprising: a transceiver configured to communicate with a radio access network, a memory, and a processor communicatively coupled to the transceiver and the memory, wherein the processor and the memory are configured to perform any one of aspects 17 through 29.

Aspect 31: A UE configured for wireless communication comprising at least one means for performing any one of aspects 17 through 29.

Aspect 32: A non-transitory computer-readable storage medium having instructions for a UE thereon, wherein the instructions, when executed by a processing circuit, cause the processing circuit to perform any one of aspects 17 through 29.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication configured to utilize a single carrier waveform, comprising:
   one or more processors; and
   a memory comprising computer-executable instructions, wherein the one or more processors are configured to execute the computer-executable instructions and cause a base station to:
   determine a random access configuration to configure at least one user equipment (UE) with a two-step random access channel (RACH) process configured with the single carrier waveform,
   wherein the two-step RACH process comprises a communication of a first message that includes a preamble portion including a physical random access channel (PRACH) message and further includes a payload portion including a physical uplink shared channel (PUSCH) message,
   wherein the one or more processors configured to cause the base station to determine the random access configuration are configured to cause the base station to determine the random access configuration to exclude a demodulation reference signal (DMRS) from the payload portion when the single carrier waveform is utilized based on satisfaction of one or more conditions comprising a transmission power for a transmission of the preamble portion being the same as a transmission power for a transmission of the payload portion;
   generate configuration information including the random access configuration indicating the two-step RACH process, the configuration information including a configuration for the transmission of the preamble portion and the transmission of the payload portion without the DMRS based on the satisfaction of the one or more conditions;

transmit the configuration information to the at least one UE; and receive, from the at least one UE and based on the configuration information, a first RACH message that includes the preamble portion and the payload portion without the DMRS, using the single carrier waveform.

2. The apparatus of claim 1, wherein the one or more conditions further comprise at least one of:
a bandwidth for the preamble portion being greater than or equal to a bandwidth for the payload portion;
a UE radio frequency (RF) configuration for the transmission of the preamble portion being the same as a UE RF configuration for the transmission of the payload portion;
a time elapsed between the transmission of the preamble portion and the transmission of the payload portion being less than an elapsed time threshold; or
if a discrete Fourier transform spread orthogonal frequency-division multiplexing (DFT-s-OFDM) waveform is used, a subcarrier spacing associated with resources for the transmission of the preamble portion being the same as a subcarrier spacing associated with resources for the transmission of the payload portion.

3. The apparatus of claim 2, wherein the configuration information indicates a plurality of RACH occasions for the preamble portion and a plurality of PUSCH occasions for the payload portion, and
wherein the one or more processors configured to cause the base station to receive the first RACH message are configured to cause the base station to:
receive the payload portion including the PUSCH message without the DMRS when an offset time between a RACH occasion selected from the plurality of RACH occasions for the preamble portion and a PUSCH occasion selected from the plurality of PUSCH occasions for the payload portion is shorter than an offset time threshold; and
receive the payload portion including the PUSCH message and the DMRS when the offset time between the RACH occasion selected for the preamble portion and the PUSCH occasion selected for the payload portion is greater than or equal to the offset time threshold to cause the time elapsed between the transmission of the preamble portion and the transmission of the payload portion to be greater than or equal to the elapsed time threshold.

4. The apparatus of claim 1, wherein the configuration information indicates that RF switching is not to be performed between the transmission of the preamble portion and the transmission of the payload portion.

5. The apparatus of claim 1, wherein the one or more processors are further configured to cause the base station to:
determine that a bandwidth and a frequency range for the preamble portion are the same as a bandwidth and a frequency range for the payload portion; and
wherein the one or more processors configured to cause the base station to generate the configuration information are configured to cause the base station to generate, based on the determining that the bandwidth and the frequency range are the same for the preamble portion and the payload portion, scheduling information to schedule the transmission of the payload portion to occur immediately after the transmission of the preamble portion.

6. The apparatus of claim 5, wherein:
when a length of a cyclic prefix (CP) of the payload portion is configured to be greater than or equal to a length of a CP of the preamble portion, the configuration information comprises an indication to exclude a guard time in the preamble portion occurring after the PRACH message; and
when the length of the CP of the payload portion is configured to be shorter than the length of the CP of the preamble portion, the configuration information comprises an indication to include at least one of the guard time in the preamble portion occurring after the PRACH message or a time gap occurring between the preamble portion and the payload portion.

7. The apparatus of claim 6, wherein the one or more processors are further configured to cause the base station to determine, when the configuration information comprises the indication to exclude the guard time in the preamble portion occurring after the PRACH message, the length of the CP of the preamble portion and the length of the CP of the payload portion based on a length of the guard time,
wherein the length of the CP of the preamble portion and the length of the CP of the payload portion are included in the configuration information.

8. The apparatus of claim 1, wherein the one or more conditions further comprise a bandwidth and a frequency range for the preamble portion being the same as a bandwidth and a frequency range for the payload portion.

9. The apparatus of claim 8, wherein the configuration information indicates:
a first configuration including the configuration for the transmission of the preamble portion and the transmission of the payload portion without the DMRS when the satisfaction of the one or more conditions is achieved; and
a second configuration for the transmission of the preamble portion and the transmission of the payload portion with a DMRS when the satisfaction of the one or more conditions is not achieved.

10. The apparatus of claim 9, wherein at least one RACH occasion for the preamble portion of the first configuration is orthogonal to at least one RACH occasion for the preamble portion of the second configuration, and
wherein at least one PUSCH occasion for the preamble portion of the first configuration is orthogonal to at least one PUSCH occasion for the preamble portion of the second configuration.

11. A method of wireless communication by a base station configured to utilize a single carrier waveform, comprising:
determining a random access configuration to configure at least one user equipment (UE) with a two-step random access channel (RACH) process configured with the single carrier waveform,
wherein the two-step RACH process comprises a communication of a first message that includes a preamble portion including a physical random access channel (PRACH) message and further includes a payload portion including a physical uplink shared channel (PUSCH) message,
wherein the determining the random access configuration comprises determining to exclude a demodulation reference signal (DMRS) from the payload portion when the single carrier waveform is utilized based on satisfaction of one or more conditions comprising a transmission power for a transmission of the preamble portion being the same as a transmission power for a transmission of the payload portion;

generating configuration information including the random access configuration indicating the two-step RACH process, the configuration information including a configuration for the transmission of the preamble portion and the transmission of the payload portion without the DMRS based on the satisfaction of the one or more conditions;

transmitting the configuration information to the at least one UE; and receiving, from the at least one UE and based on the configuration information, a first RACH message that includes the preamble portion and the payload portion without the DMRS, using the single carrier waveform.

12. The method of claim 11, wherein the one or more conditions further comprise at least one of:

a bandwidth for the preamble portion being greater than or equal to a bandwidth for the payload portion;

a UE radio frequency (RF) configuration for the transmission of the preamble portion being the same as a UE RF configuration for the transmission of the payload portion;

a time elapsed between the transmission of the preamble portion and the transmission of the payload portion being less than an elapsed time threshold; or if a discrete Fourier transform spread orthogonal frequency-division multiplexing (DFT-s-OFDM) waveform is used, a subcarrier spacing associated with resources for the transmission of the preamble portion being the same as a subcarrier spacing associated with resources for the transmission of the payload portion.

13. The method of claim 11, wherein the configuration information indicates that RF switching is not to be performed between the transmission of the preamble portion and the transmission of the payload portion.

14. The method of claim 11, further comprising:

determining that a bandwidth and a frequency range for the preamble portion are the same as a bandwidth and a frequency range for the payload portion;

wherein the generating the configuration information comprises generating, based on the determining that the bandwidth and the frequency range are the same for the preamble portion and the payload portion, scheduling information to schedule the transmission of the payload portion to occur immediately after the transmission of the preamble portion.

15. The method of claim 14, wherein:

when a length of a cyclic prefix (CP) of the payload portion is configured to be greater than or equal to a length of a CP of the preamble portion, the configuration information comprises an indication to exclude a guard time in the preamble portion occurring after the PRACH message; and when the length of the CP of the payload portion is configured to be shorter than the length of the CP of the preamble portion, the configuration information comprises an indication to include at least one of the guard time in the preamble portion occurring after the PRACH message or a time gap occurring between the preamble portion and the payload portion.

16. An apparatus for wireless communication configured to utilize a single carrier waveform, comprising:

one or more processors; and a memory comprising computer-executable instructions, wherein the one or more processors are configured to execute the computer-executable instructions and cause a user equipment (UE) to:

wherein the one or more processors are configured to:

receive, from a base station, configuration information including a random access configuration indicating a two-step random access channel (RACH) process configured with the single carrier waveform, the two-step RACH process comprising a communication of a first message that includes a preamble portion including a physical random access channel (PRACH) message and further includes a payload portion including a physical uplink shared channel (PUSCH) message, wherein the configuration information includes a configuration for a transmission of the preamble portion and a transmission of the payload portion without a demodulation reference signal (DMRS) when the single carrier waveform is utilized based on satisfaction of one or more conditions comprising a transmission power for the transmission of the preamble portion being the same as a transmission power for the transmission of the payload portion;

configure the UE with the two-step RACH process based on the configuration information; and transmit, to the base station and based on the configuration information, a first RACH message that includes the preamble portion and the payload portion without the DMRS, using the single carrier waveform.

17. The apparatus of claim 16, wherein the one or more conditions further comprise at least one of:

a bandwidth for the preamble portion being greater than or equal to a bandwidth for the payload portion;

a UE radio frequency (RF) configuration for the transmission of the preamble portion being the same as a UE RF configuration for the transmission of the payload portion;

a time elapsed between the transmission of the preamble portion and the transmission of the payload portion being less than an elapsed time threshold; or if a discrete Fourier transform spread orthogonal frequency-division multiplexing (DFT-s-OFDM) waveform is used, a subcarrier spacing associated with resources for the transmission of the preamble portion being the same as a subcarrier spacing associated with resources for the transmission of the payload portion.

18. The apparatus of claim 17, wherein the configuration information indicates a plurality of RACH occasions for the preamble portion and a plurality of PUSCH occasions for the payload portion, and wherein the one or more processors configured to cause the UE to transmit the first RACH message are configured to cause the UE to:

transmit the payload portion including the PUSCH message without the DMRS when an offset time between a RACH occasion selected from the plurality of RACH occasions for the preamble portion and a PUSCH occasion selected from the plurality of PUSCH occasions for the payload portion is shorter than an offset time threshold; and transmit the payload portion including the PUSCH message and the DMRS when the offset time between the RACH occasion selected for the preamble portion and the PUSCH occasion selected for the payload portion is greater than or equal to the offset time threshold to cause the time elapsed between the transmission of the preamble portion and the transmission of the payload portion to be greater than or equal to the elapsed time threshold.

19. The apparatus of claim 16, wherein the configuration information indicates that RF switching is not to be performed between the transmission of the preamble portion and the transmission of the payload portion.

20. The apparatus of claim 16:
wherein the bandwidth and the frequency range are the same for the preamble portion and the payload portion; and
wherein the configuration information includes scheduling information to schedule the transmission of the payload portion to occur immediately after the transmission of the preamble portion, based on the bandwidth and the frequency range being the same for the preamble portion and the payload portion.

21. The apparatus of claim 20, wherein:
when a length of a cyclic prefix (CP) of the payload portion is configured to be greater than or equal to a length of a CP of the preamble portion, the configuration information comprises an indication to exclude a guard time in the preamble portion occurring after the PRACH message; and
when the length of the CP of the payload portion is configured to be shorter than the length of the CP of the preamble portion, the configuration information comprises an indication to include at least one of the guard time in the preamble portion occurring after the PRACH message or a time gap occurring between the preamble portion and the payload portion.

22. The apparatus of claim 21, wherein when the configuration information comprises the indication to exclude the guard time in the preamble portion occurring after the PRACH message, the length of the CP of the preamble portion and the length of the CP of the payload portion is based on a length of the guard time, and
wherein the length of the CP of the preamble portion and the length of the CP of the payload portion are included in the configuration information.

23. The apparatus of claim 16, wherein the one or more conditions further comprise a bandwidth and a frequency range for the preamble portion being the same as a bandwidth and a frequency range for the payload portion.

24. The apparatus of claim 23, wherein the configuration information indicates:
a first configuration including the configuration for the transmission of the preamble portion and the transmission of the payload portion without the DMRS when the satisfaction of the one or more conditions is achieved; and
a second configuration for the transmission of the preamble portion and the transmission of the payload portion with a DMRS when the satisfaction of the one or more conditions is not achieved.

25. The apparatus of claim 24, wherein at least one RACH occasion for the preamble portion of the first configuration is orthogonal to at least one RACH occasion for the preamble portion of the second configuration, and
wherein at least one PUSCH occasion for the preamble portion of the first configuration is orthogonal to at least one PUSCH occasion for the preamble portion of the second configuration.

26. A method of wireless communication by a user equipment (UE) configured to utilize a single carrier waveform, comprising:
receiving, from a base station, configuration information including a random access configuration indicating a two-step random access channel (RACH) process configured with the single carrier waveform, the two-step RACH process comprising a communication of a first message that includes a preamble portion including a physical random access channel (PRACH) message and further includes a payload portion including a physical uplink shared channel (PUSCH) message,
wherein the configuration information includes a configuration for a transmission of the preamble portion and a transmission of the payload portion without a demodulation reference signal (DMRS) when the single carrier waveform is utilized based on satisfaction of one or more conditions comprising a transmission power for the transmission of the preamble portion being the same as a transmission power for the transmission of the payload portion;
configuring the UE with the two-step RACH process based on the configuration information; and
transmitting, to the base station and based on the configuration information, a first RACH message that includes the preamble portion and the payload portion without the DMRS, using the single carrier waveform.

27. The method of claim 26, wherein the one or more conditions further comprise at least one of:
a bandwidth for the preamble portion being greater than or equal to a bandwidth for the payload portion;
a UE radio frequency (RF) configuration for the transmission of the preamble portion being the same as a UE RF configuration for the transmission of the payload portion;
a time elapsed between the transmission of the preamble portion and the transmission of the payload portion being less than an elapsed time threshold; or
if a discrete Fourier transform spread orthogonal frequency-division multiplexing (DFT-s-OFDM) waveform is used, a subcarrier spacing associated with resources for the transmission of the preamble portion being the same as a subcarrier spacing associated with resources for the transmission of the payload portion.

28. The method of claim 27, wherein the configuration information indicates a plurality of RACH occasions for the preamble portion and a plurality of PUSCH occasions for the payload portion, and
wherein the transmitting the first RACH message comprises:
transmitting the payload portion including the PUSCH message without the DMRS when an offset time between a RACH occasion selected from the plurality of RACH occasions for the preamble portion and a PUSCH occasion selected from the plurality of PUSCH occasions for the payload portion is shorter than an offset time threshold; and
transmitting the payload portion including the PUSCH message and the DMRS when the offset time between the RACH occasion selected for the preamble portion and the PUSCH occasion selected for the payload portion is greater than or equal to the offset time threshold to cause the time elapsed between the transmission of the preamble portion and the transmission of the payload portion to be greater than or equal to the elapsed time threshold.

29. The method of claim 26, wherein the configuration information indicates that RF switching is not to be performed between the transmission of the preamble portion and the transmission of the payload portion.

30. The method of claim 26:
wherein the bandwidth and the frequency range are the same for the preamble portion and the payload portion; and wherein the configuration information includes scheduling information to schedule the transmission of the payload portion to occur immediately after the transmission of the preamble portion, based on the bandwidth and the frequency range being the same for the preamble portion and the payload portion.

* * * * *